(12) United States Patent
Park

(10) Patent No.: US 10,748,428 B2
(45) Date of Patent: Aug. 18, 2020

(54) VEHICLE AND CONTROL METHOD THEREFOR

(71) Applicant: LG Electronics Inc., Seoul (KR)

(72) Inventor: Sangha Park, Seoul (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 15/750,039

(22) PCT Filed: Aug. 27, 2015

(86) PCT No.: PCT/KR2015/009002
§ 371 (c)(1),
(2) Date: Feb. 2, 2018

(87) PCT Pub. No.: WO2017/022881
PCT Pub. Date: Feb. 9, 2017

(65) Prior Publication Data
US 2018/0225975 A1  Aug. 9, 2018

(30) Foreign Application Priority Data

Aug. 3, 2015 (KR) .................. 10-2015-0109602

(51) Int. Cl.
*G08G 1/00* (2006.01)
*B60K 31/00* (2006.01)
(Continued)

(52) U.S. Cl.
CPC ............... *G08G 1/22* (2013.01); *B60W 30/10* (2013.01); *B60W 30/16* (2013.01);
(Continued)

(58) Field of Classification Search
CPC ... G08G 1/00; G08G 1/01; G08G 1/16; B60K 31/00; B62D 6/00; B62D 15/02; B60W 30/18
See application file for complete search history.

(56) References Cited

U.S. PATENT DOCUMENTS 8,700,297 B2* 4/2014 Matsumura .............. G08G 1/22
701/117
2003/0187578 A1* 10/2003 Nishira ..................... B60T 7/16
701/301
(Continued)

FOREIGN PATENT DOCUMENTS

KR   10-2006-0064372   6/2006
KR   100957137        5/2010
(Continued)

*Primary Examiner* — Yuri Kan
(74) *Attorney, Agent, or Firm* — Fish & Richardson P.C.

(57) ABSTRACT

The present invention relates to a vehicle and a control method therefor. The vehicle according to one embodiment of the present invention comprises: at least one sensor for acquiring traveling information of the vehicle and external environment information of the vehicle; and a control unit for receiving traveling information of a first group, wherein the vehicles, which join the first group, are traveling on a road including a plurality of lanes, for determining a target position of the vehicle for the first group on the basis of at least one of the vehicle traveling information, the external environment information, and the traveling information of the first group, and for controlling the vehicle so as to execute at least one operation corresponding to the target position.

21 Claims, 35 Drawing Sheets

(51) Int. Cl.
  *B62D 6/00*    (2006.01)
  *B60W 50/14*   (2020.01)
  *B60W 30/16*   (2020.01)
  *B60W 40/02*   (2006.01)
  *G08G 1/0962*  (2006.01)
  *H04W 4/02*    (2018.01)
  *G06K 9/00*    (2006.01)
  *B60W 30/10*   (2006.01)
  *B60W 30/18*   (2012.01)
  *G05D 1/02*    (2020.01)
  *G08G 1/01*    (2006.01)
  *G08G 1/052*   (2006.01)
  *G08G 1/056*   (2006.01)

(52) U.S. Cl.
  CPC ...... *B60W 30/18163* (2013.01); *B60W 40/02* (2013.01); *B60W 50/14* (2013.01); *G05D 1/0212* (2013.01); *G05D 1/0293* (2013.01); *G05D 1/0295* (2013.01); *G06K 9/00791* (2013.01); *G08G 1/0112* (2013.01); *G08G 1/052* (2013.01); *G08G 1/056* (2013.01); *G08G 1/0962* (2013.01); *G08G 1/20* (2013.01); *H04W 4/02* (2013.01); *B60W 2540/215* (2020.02); *B60W 2552/00* (2020.02); *B60W 2554/80* (2020.02); *B60W 2555/60* (2020.02); *B60W 2556/65* (2020.02); *B60W 2754/30* (2020.02); *B60W 2756/10* (2020.02); *G05D 2201/0213* (2013.01)

(56) References Cited

U.S. PATENT DOCUMENTS

| | | | | |
|---|---|---|---|---|
| 2005/0256630 | A1* | 11/2005 | Nishira | B60K 31/0008 701/96 |
| 2009/0088925 | A1* | 4/2009 | Sugawara | B60W 30/12 701/41 |
| 2013/0231830 | A1* | 9/2013 | Van Dan Elzen | B60W 50/14 701/42 |
| 2016/0063858 | A1* | 3/2016 | Schmudderich | B60W 40/04 701/117 |
| 2016/0107687 | A1* | 4/2016 | Yamaoka | B62D 15/0255 701/41 |
| 2016/0297447 | A1* | 10/2016 | Suzuki | B60W 30/16 |

FOREIGN PATENT DOCUMENTS

| KR | 10-2013-0058362 | 6/2013 |
|---|---|---|
| KR | 101371930 | 3/2014 |

* cited by examiner

[FIG. 1]
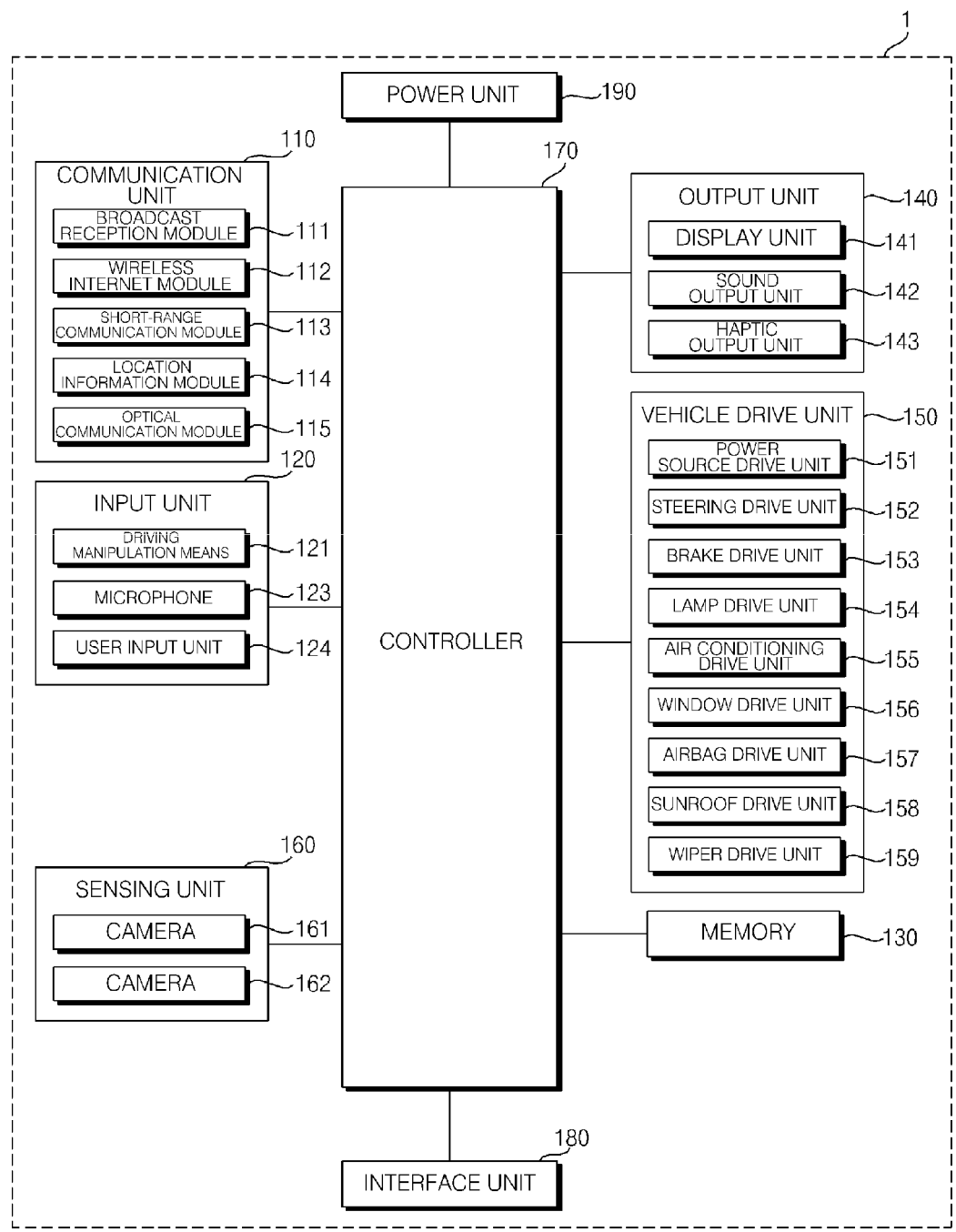

[FIG. 2]
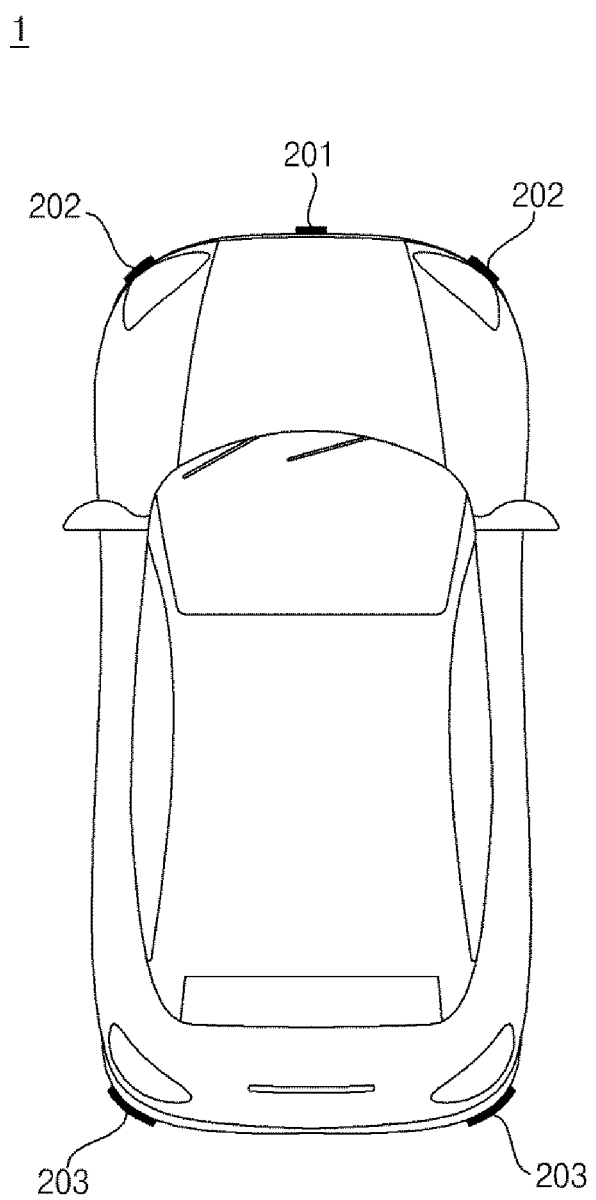

[FIG. 3]
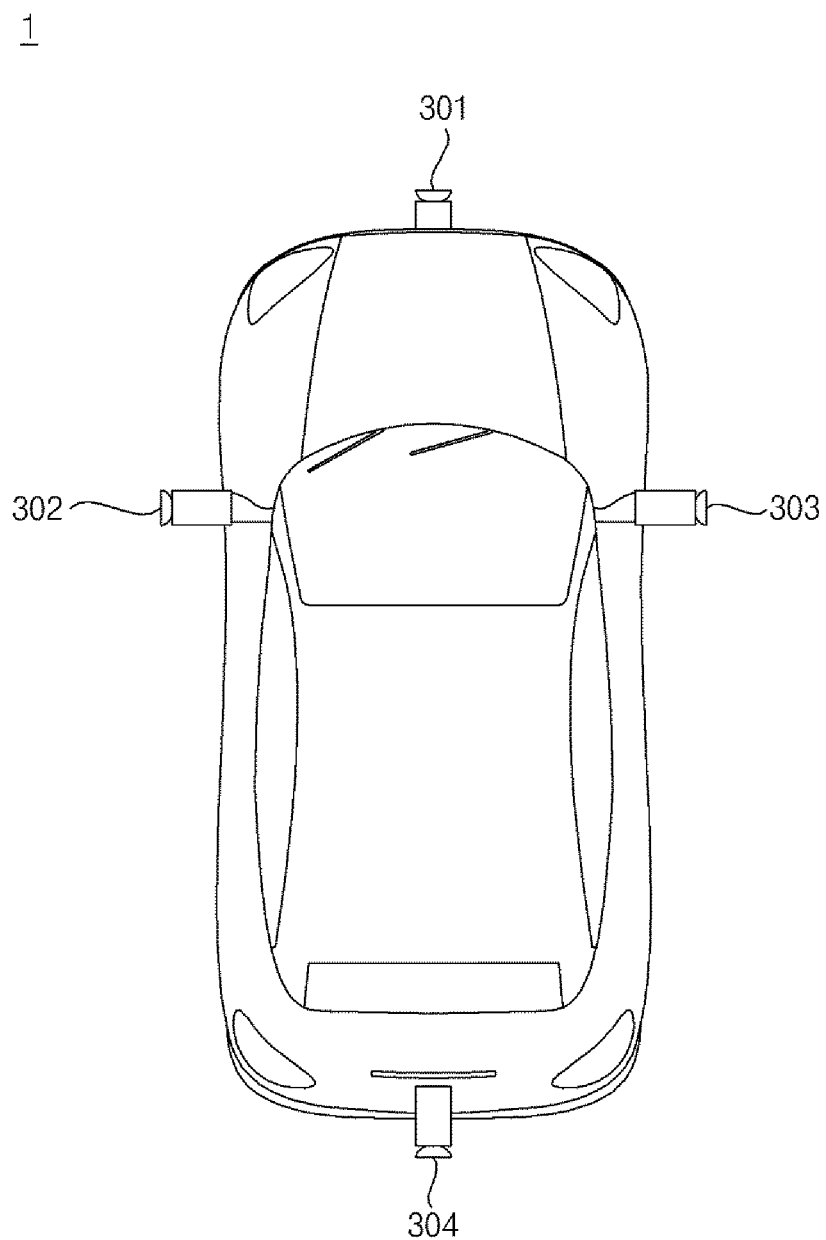

[FIG. 4]
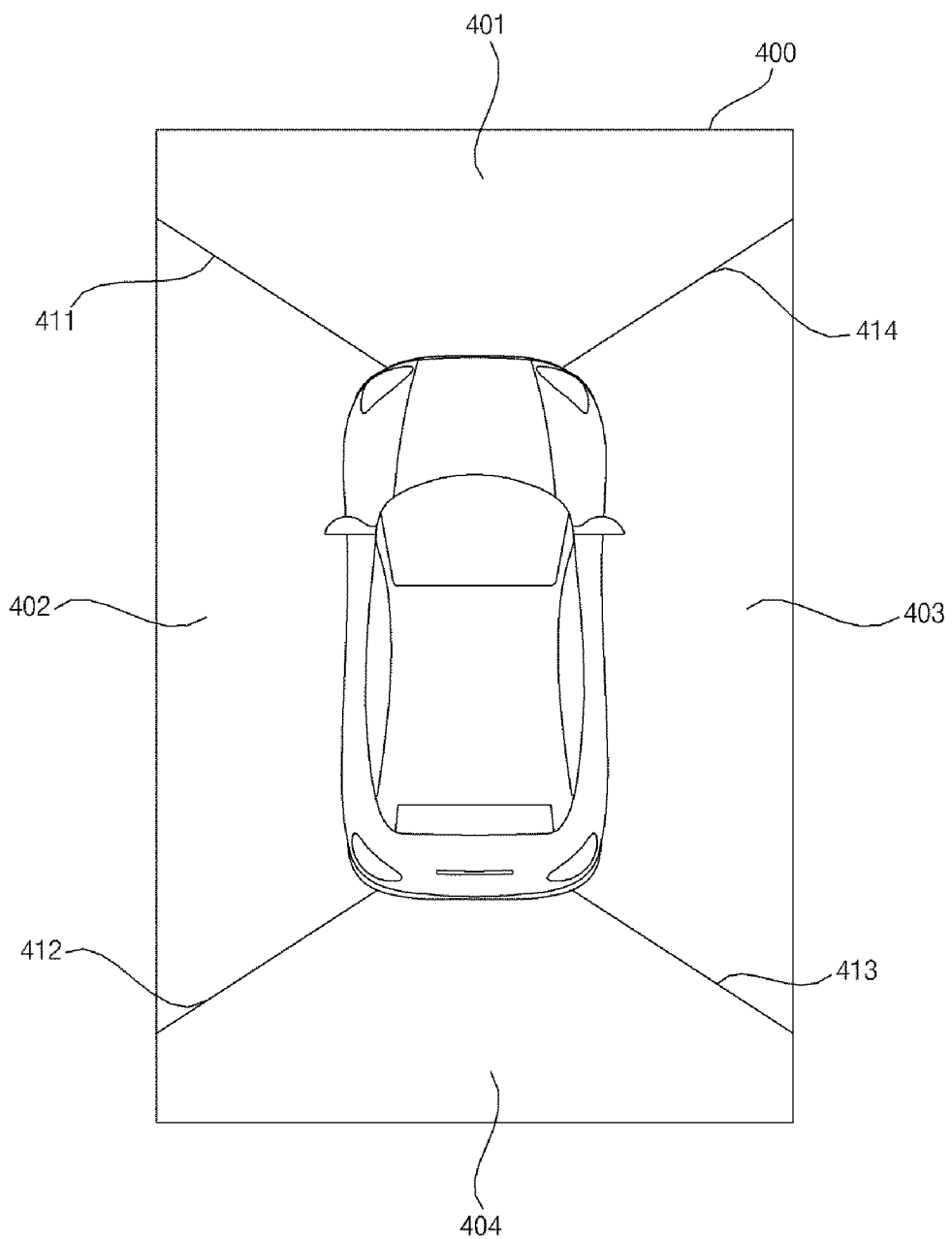

[FIG. 5]
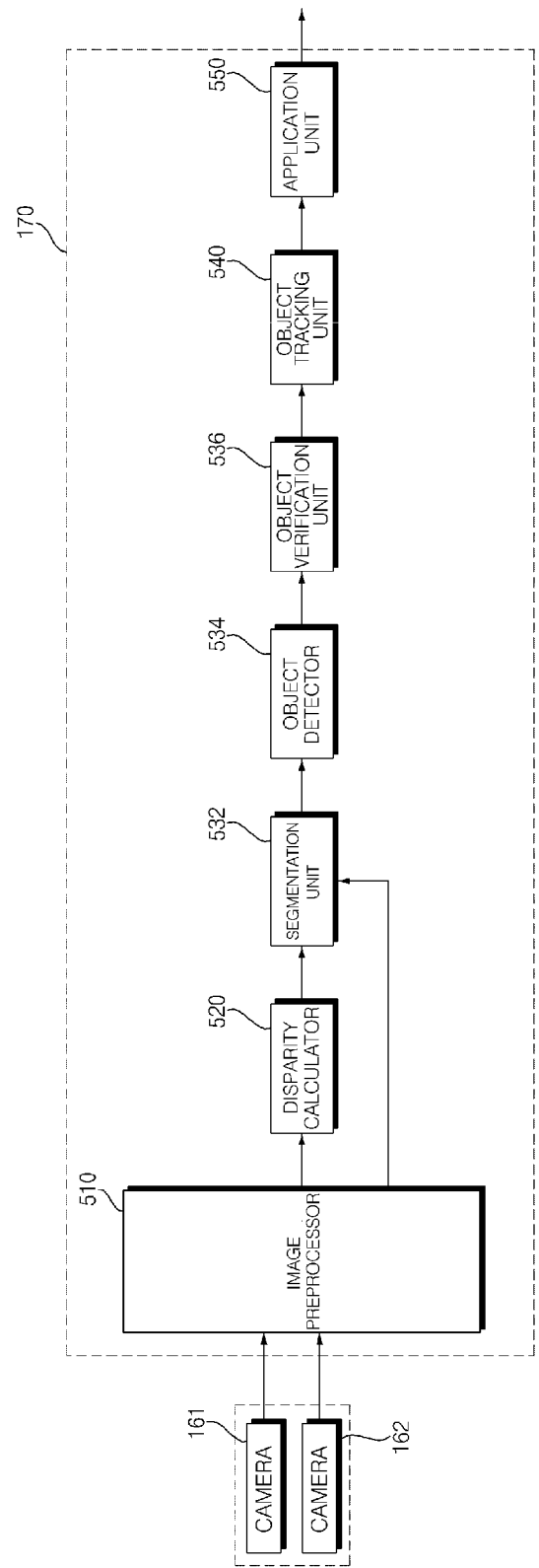

[FIG. 6A]
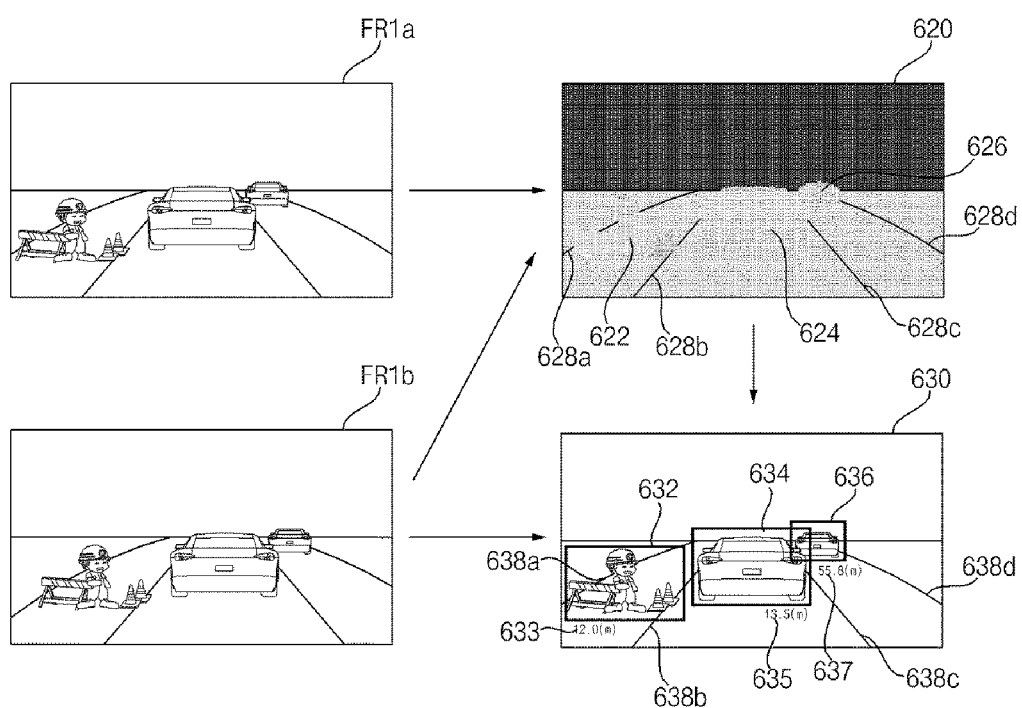

[FIG. 6B]
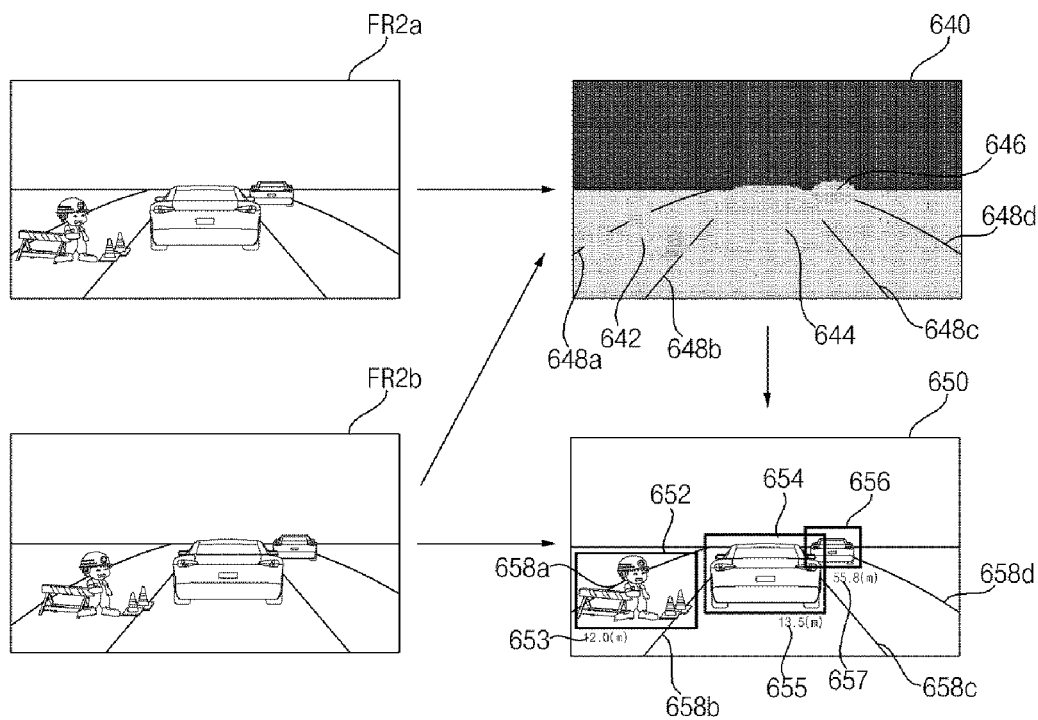

[FIG. 7]
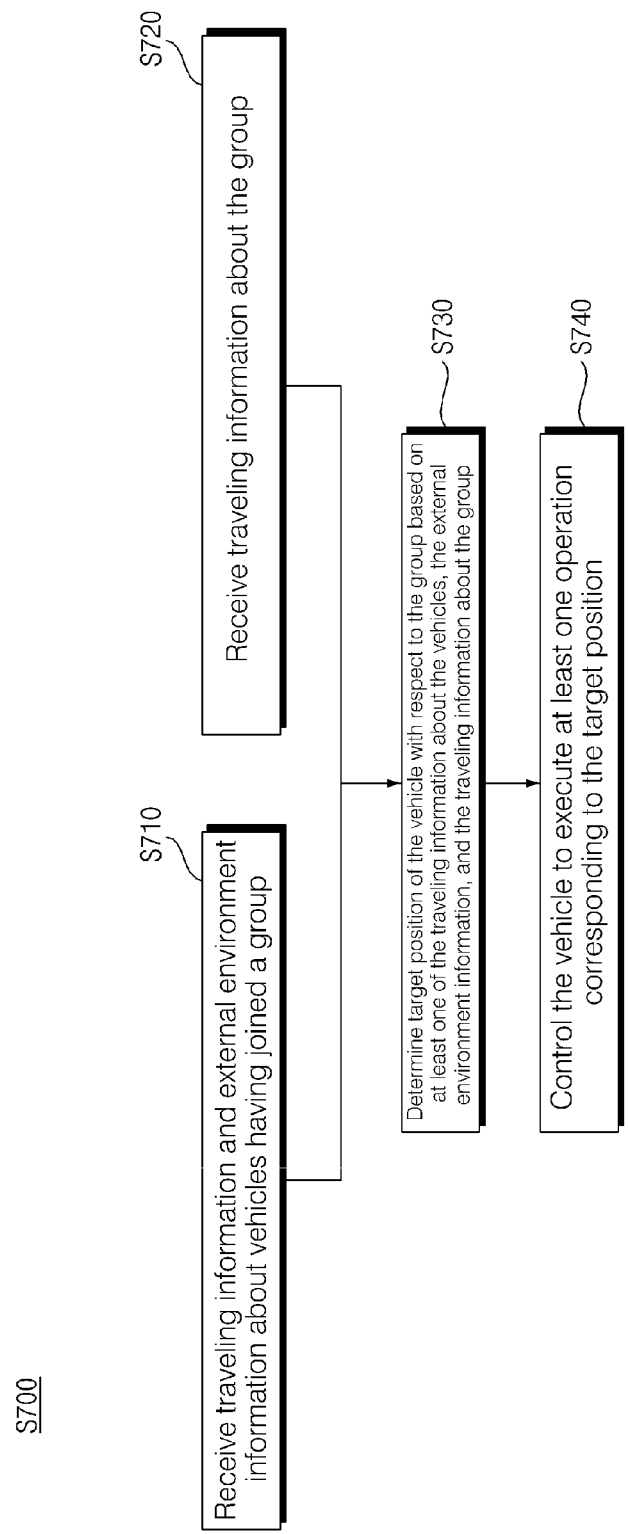

[FIG. 8]
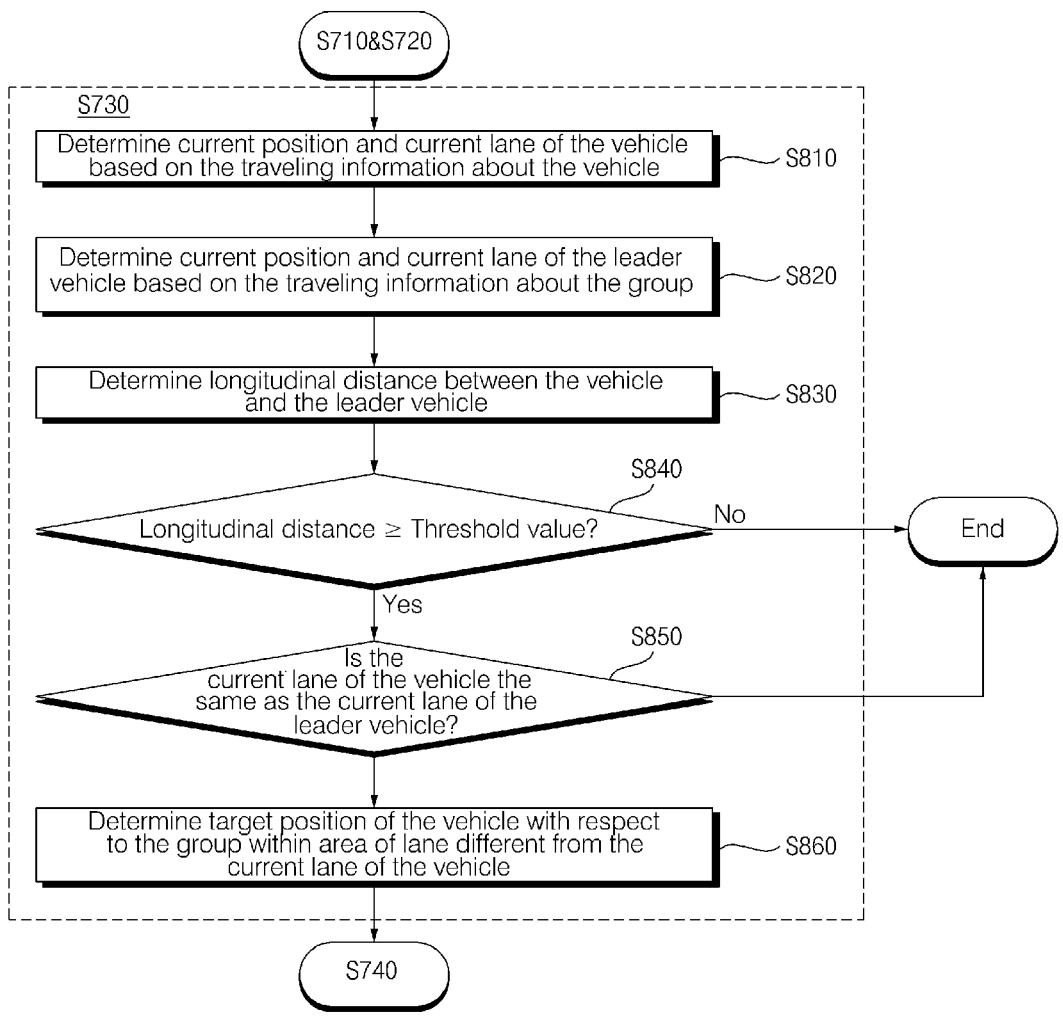

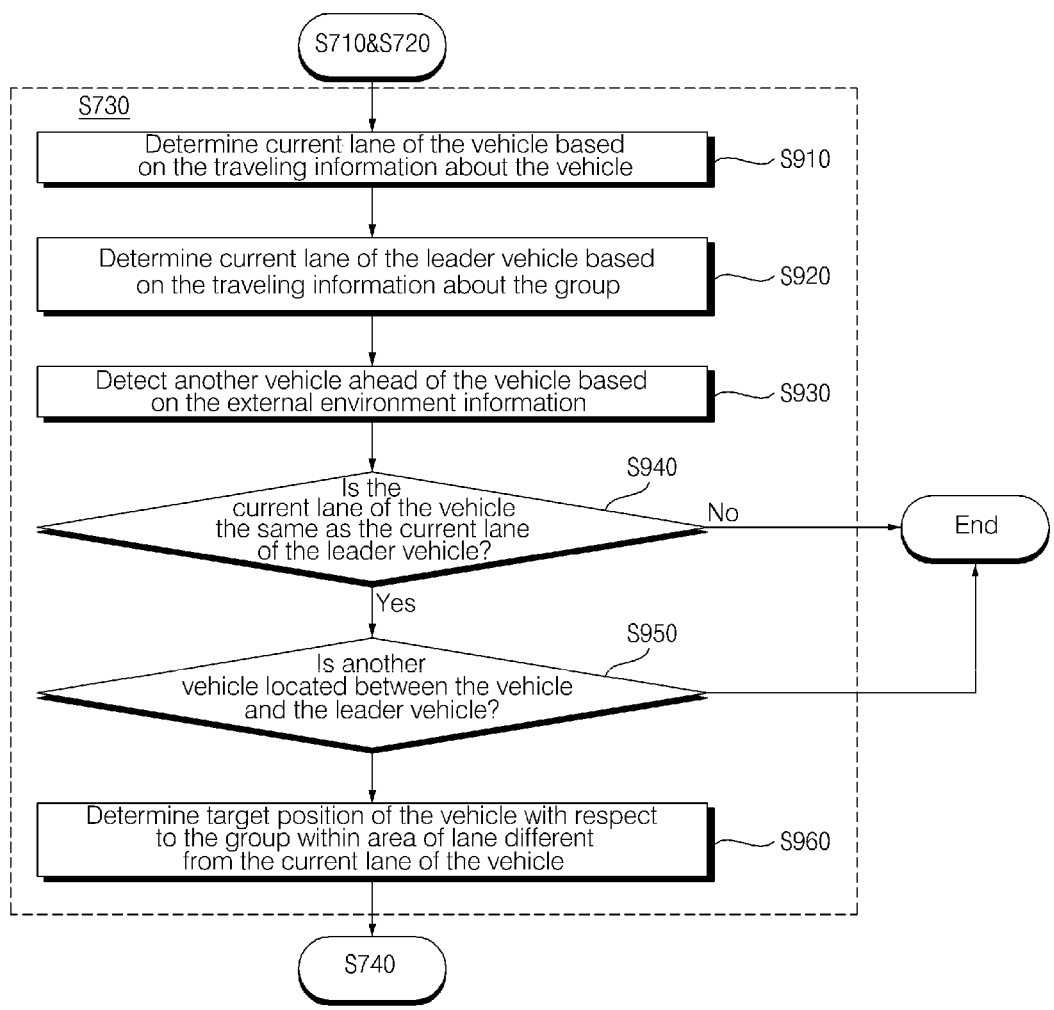
[FIG. 9]

[FIG. 10]
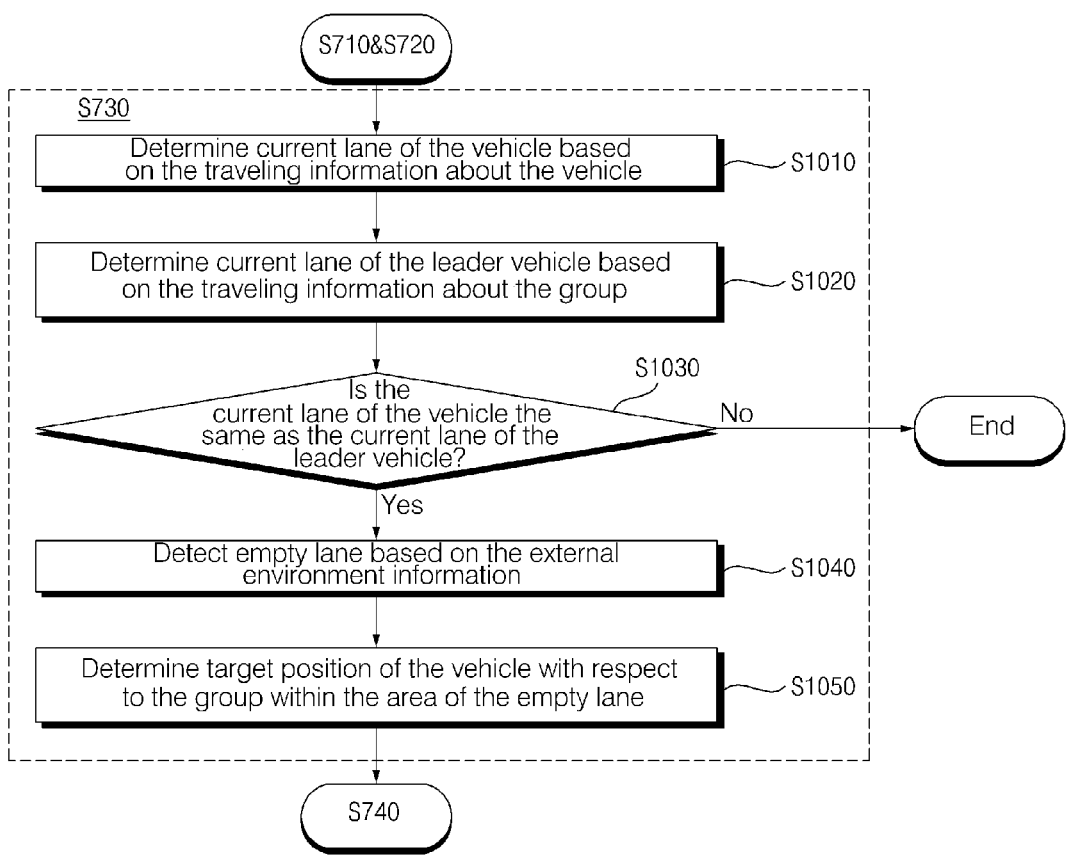

[FIG. 11]
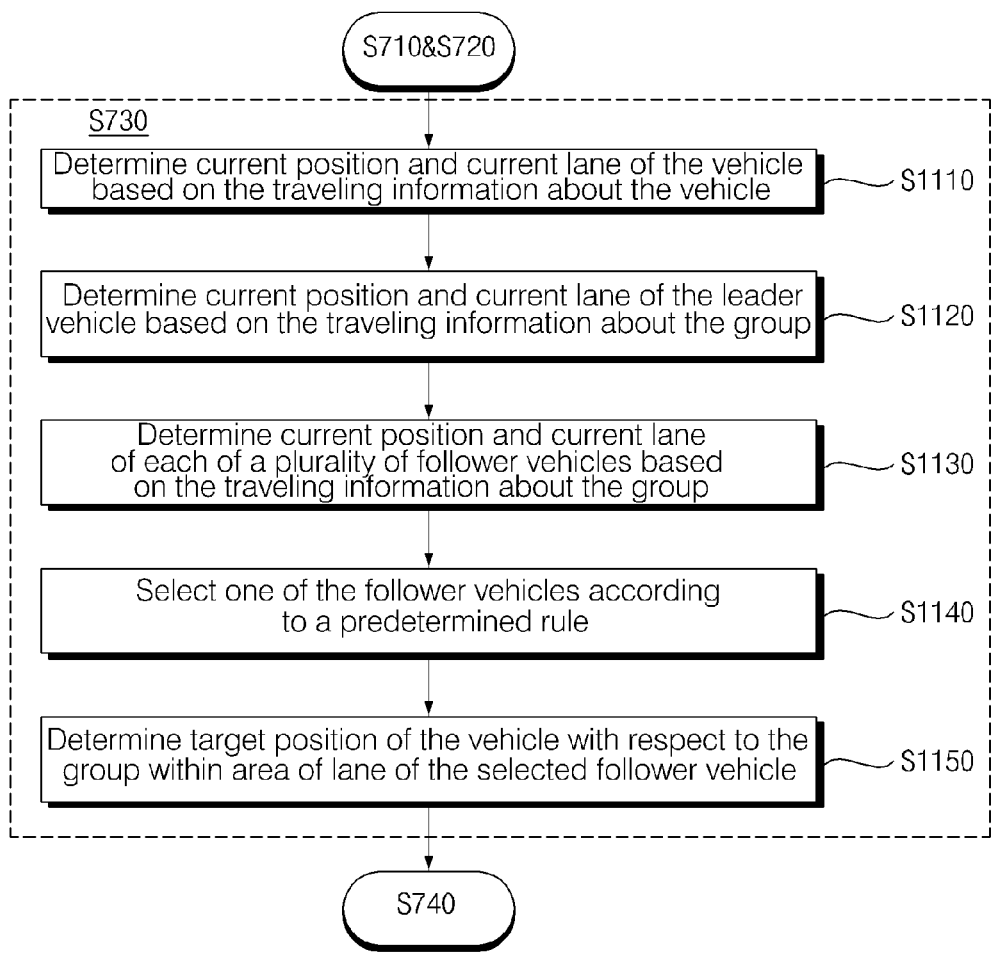

[FIG. 12A]
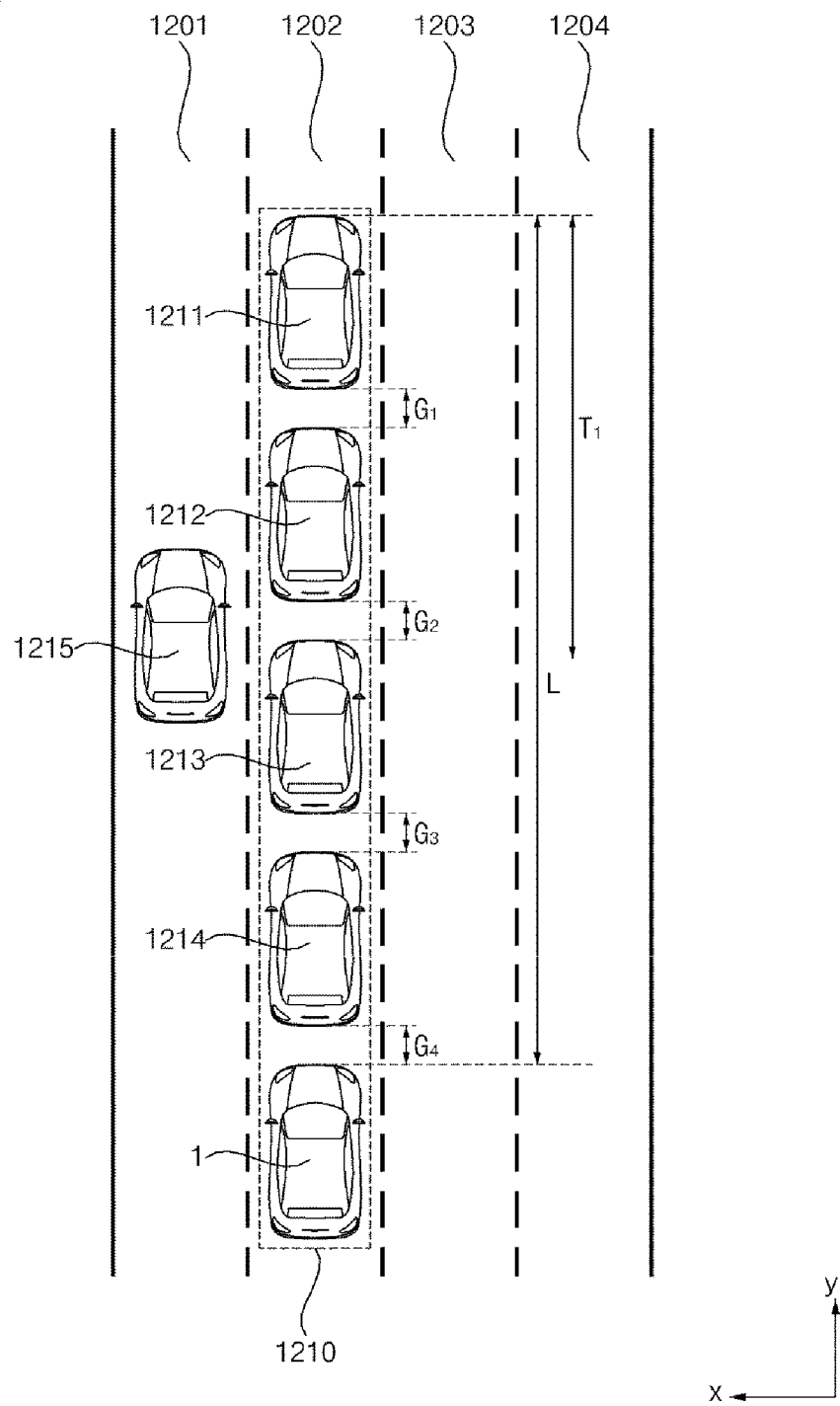

【FIG. 12B】
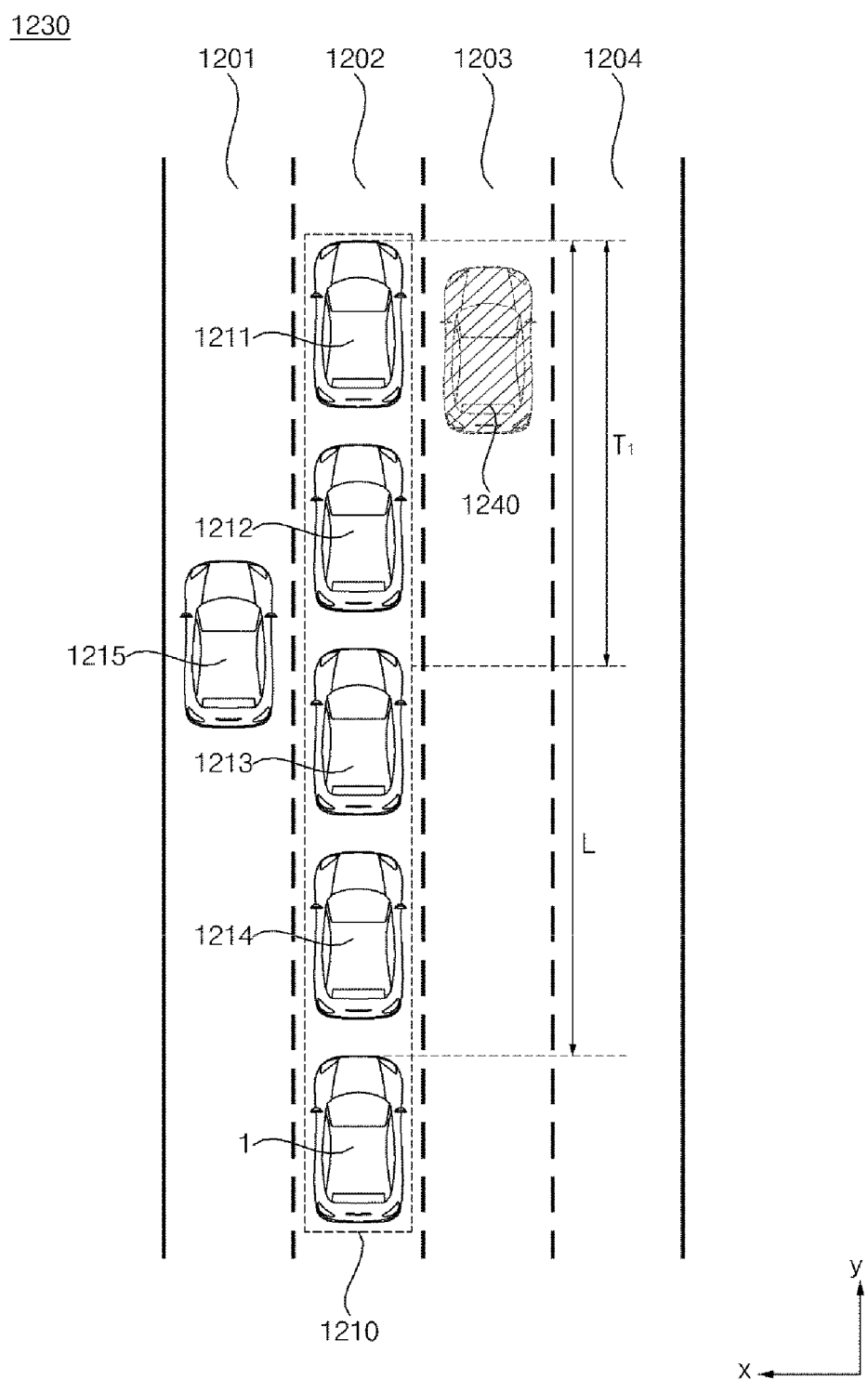

【FIG. 12C】
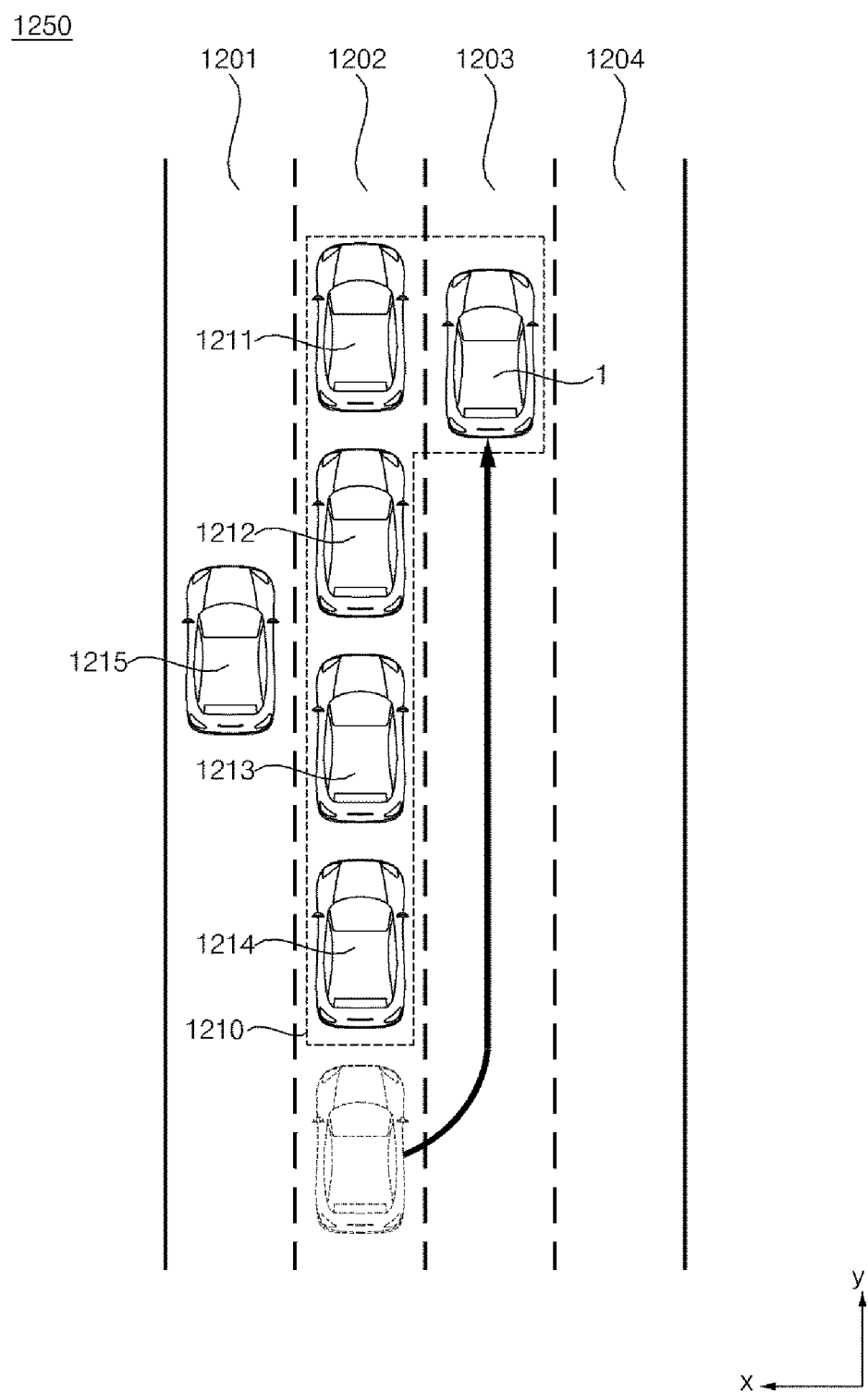

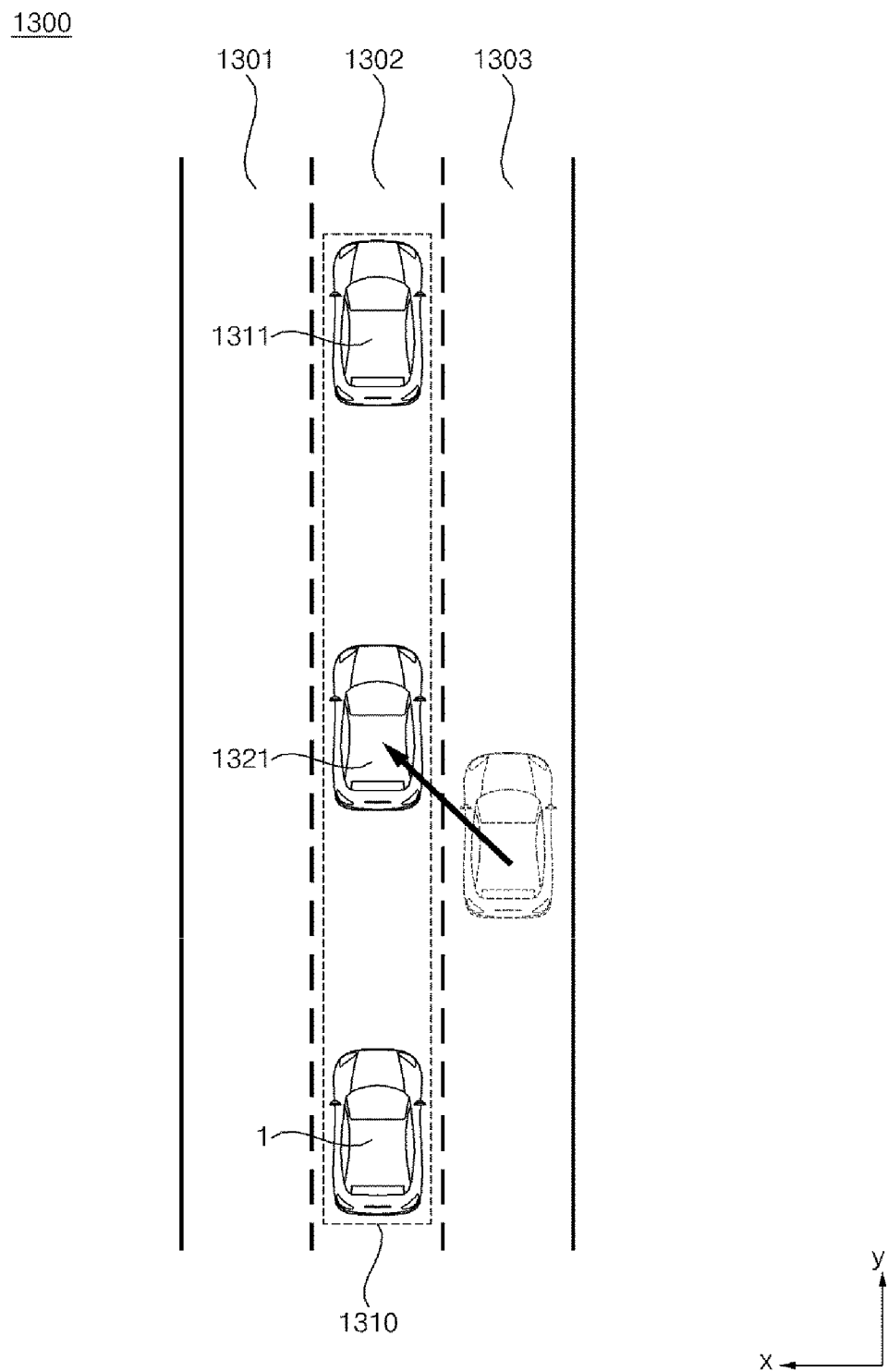
[FIG. 13A]

[FIG. 13B]
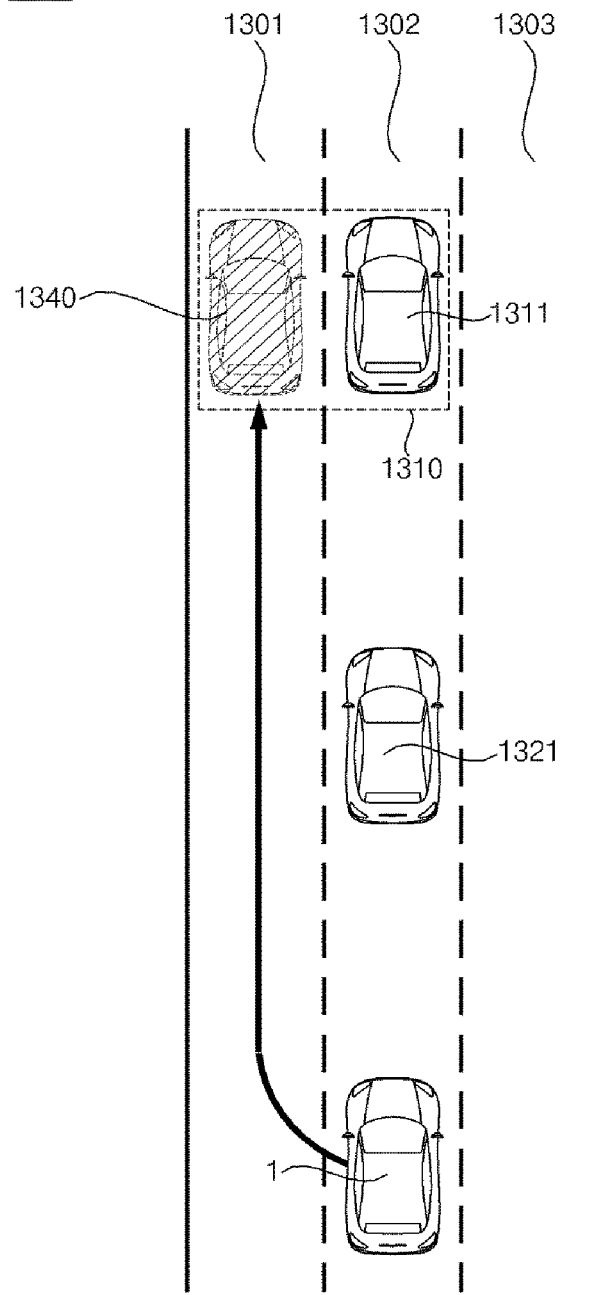
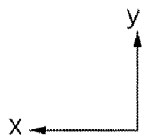

【FIG. 13C】
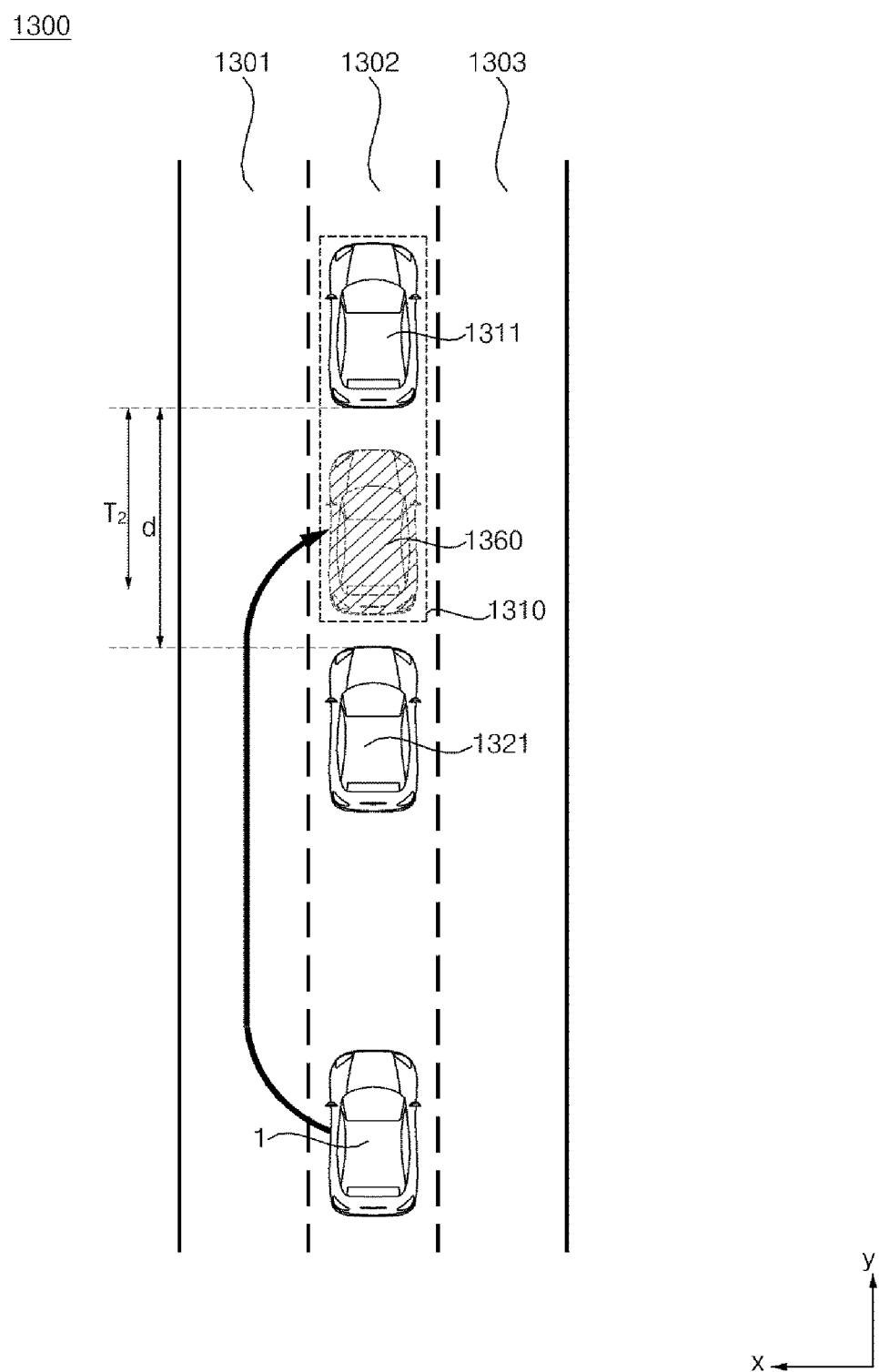

[FIG. 14A]
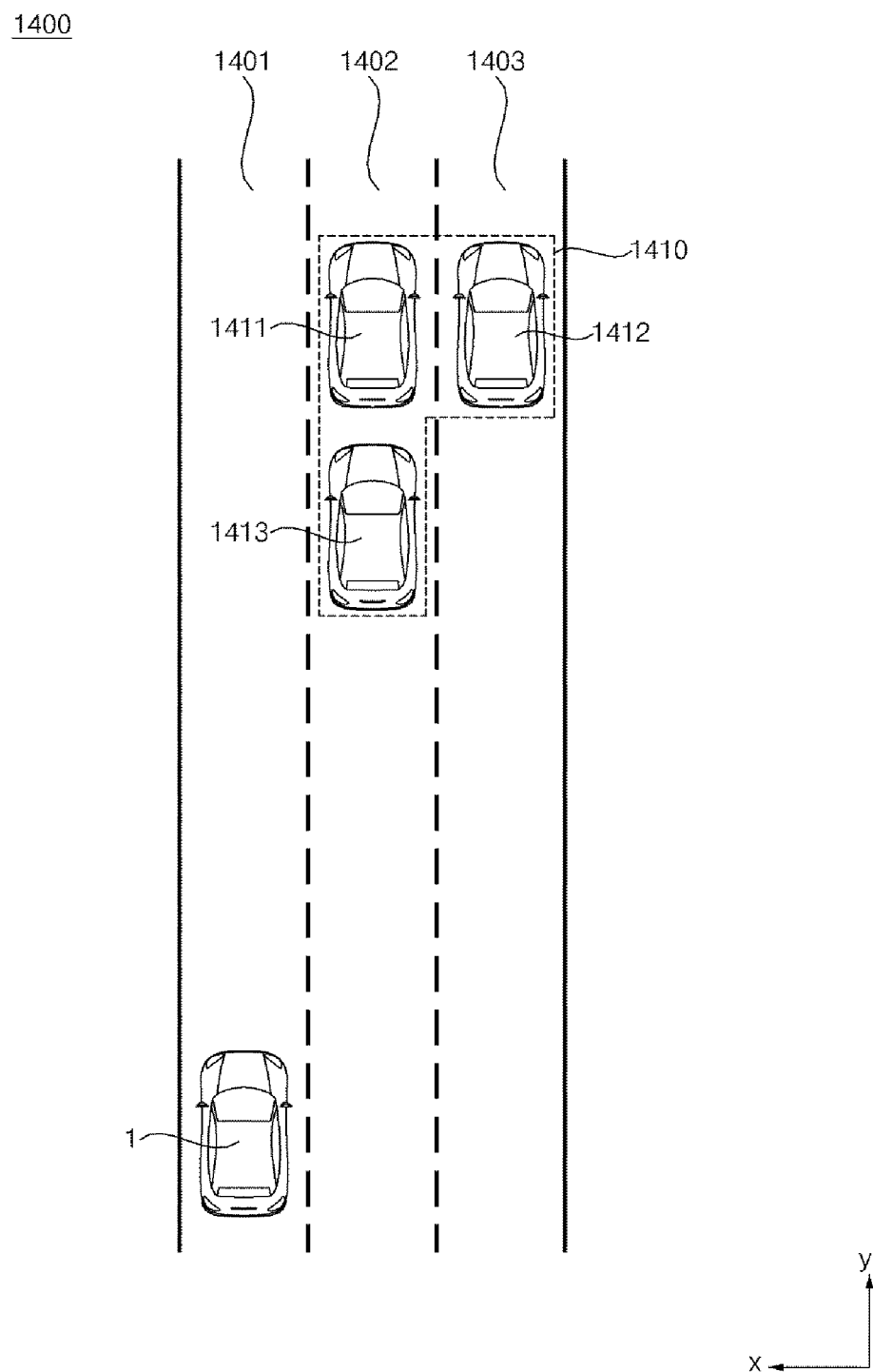

[FIG. 14B]
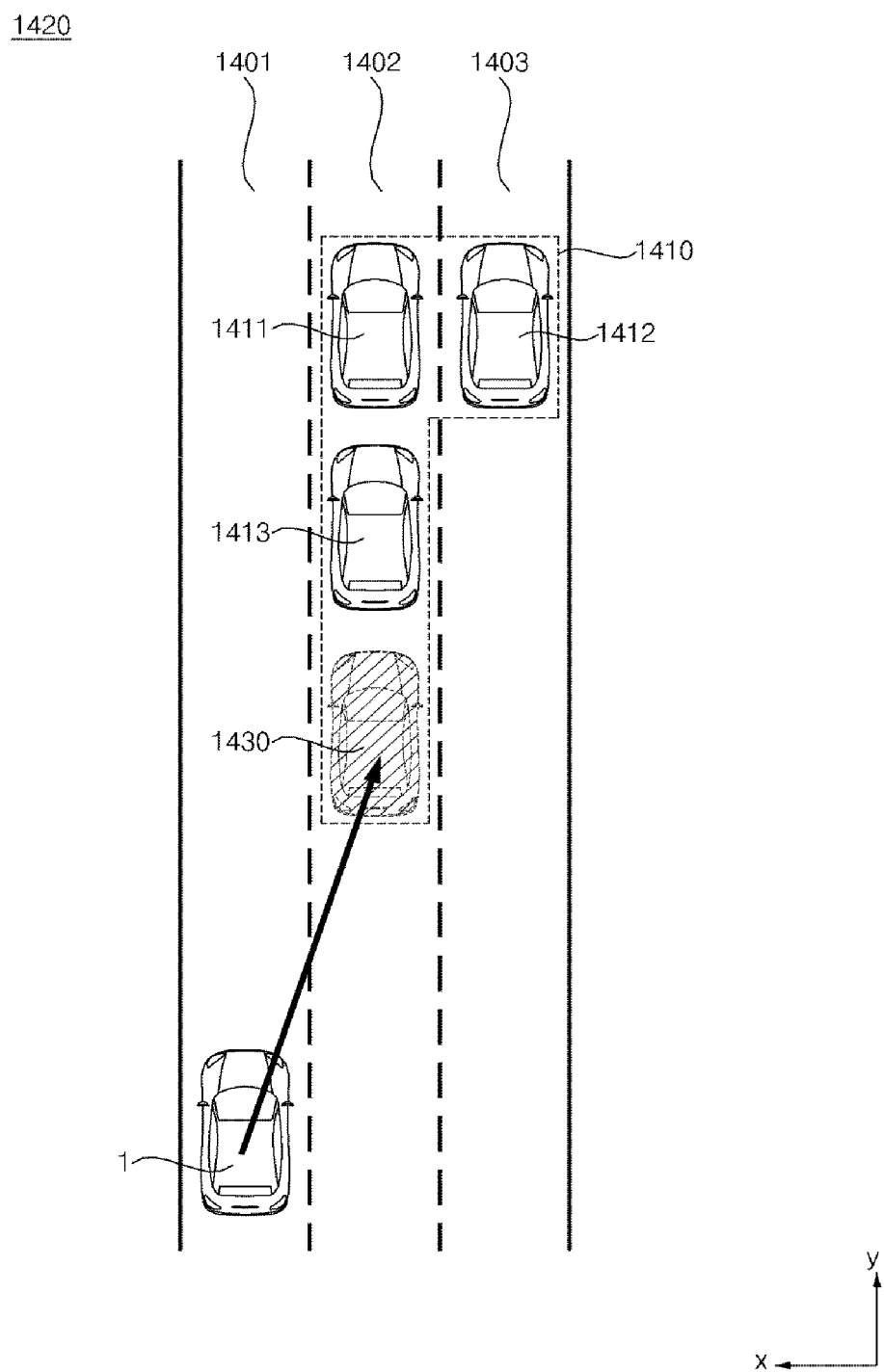

[FIG. 14C]
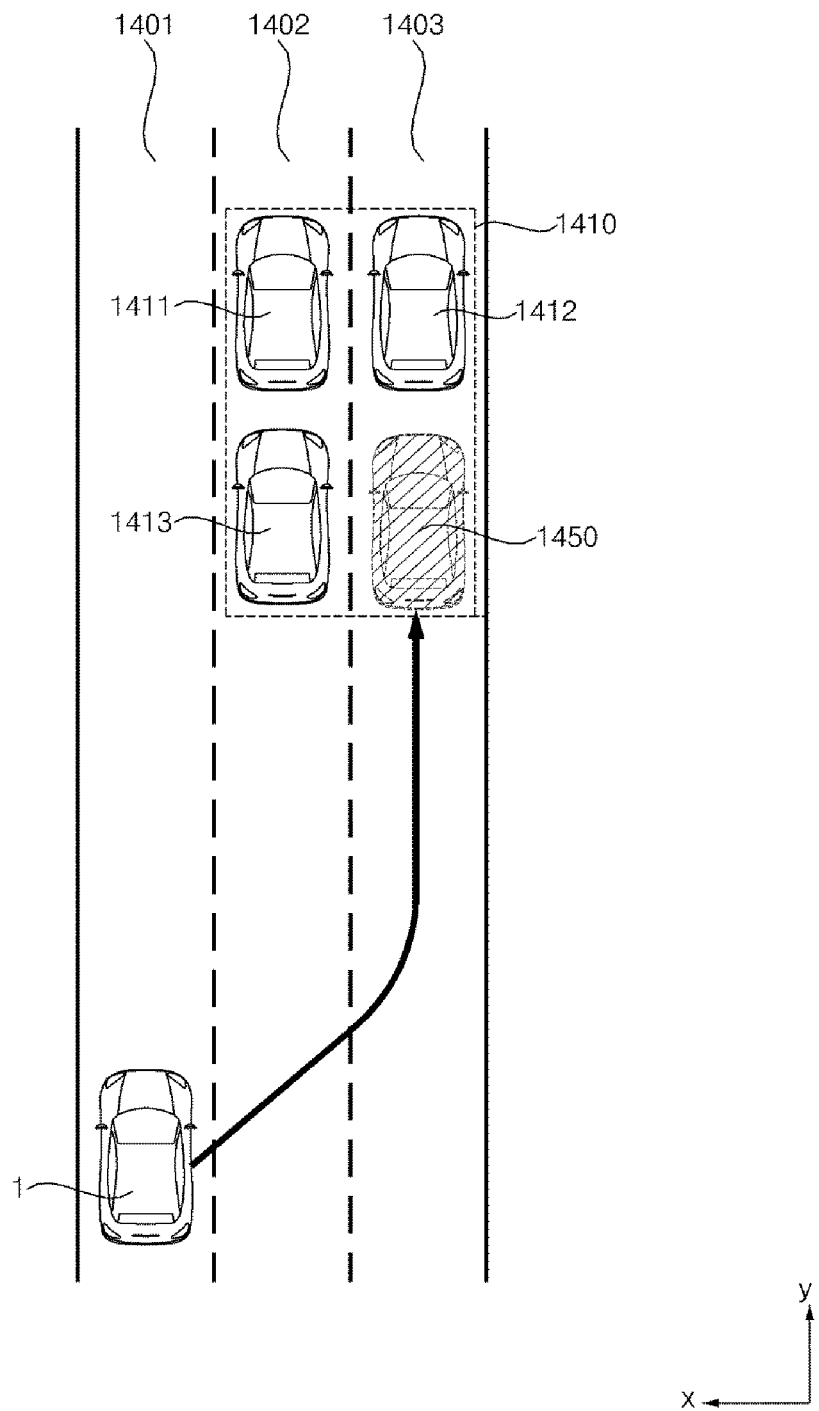

[FIG. 14D]
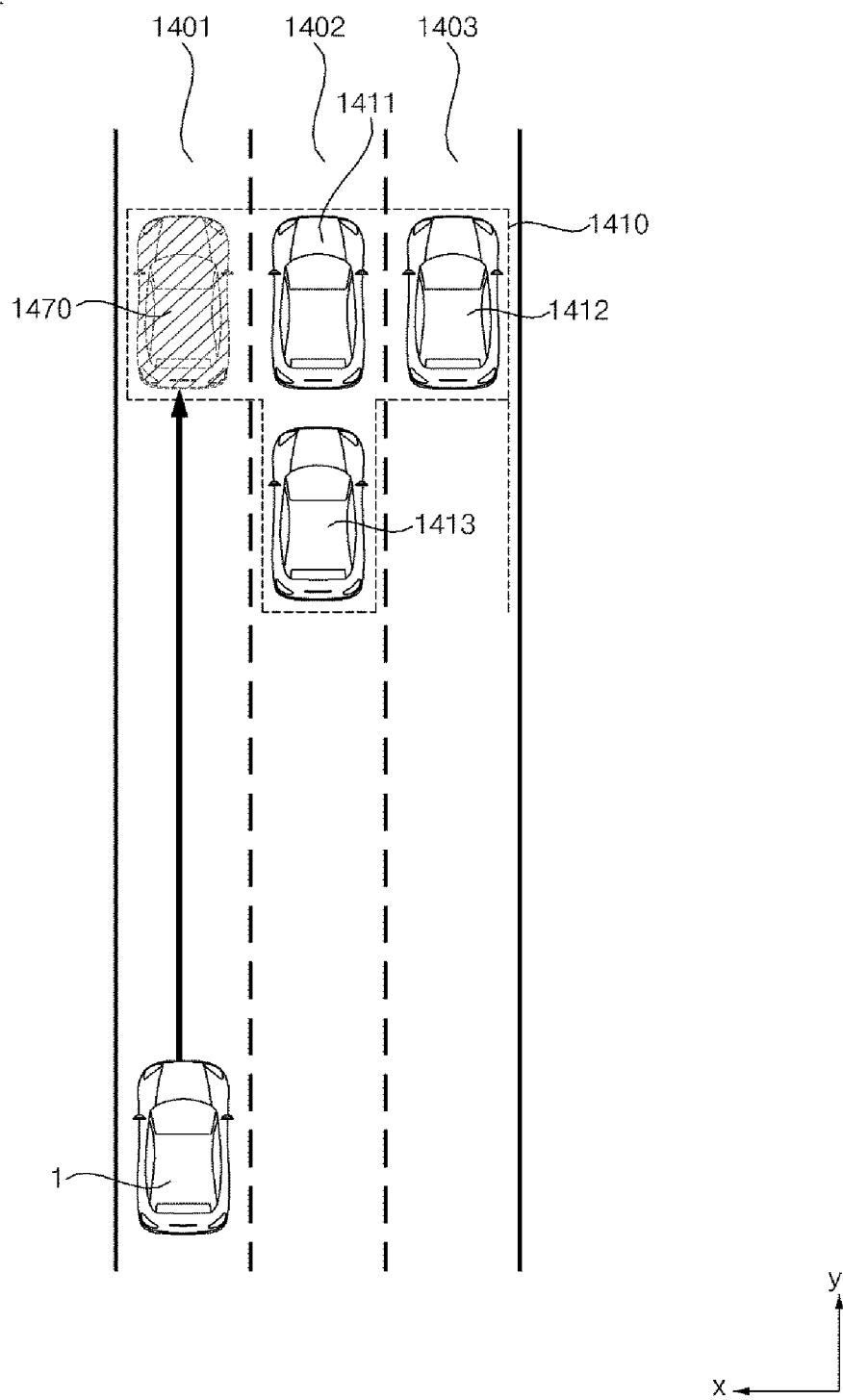

[FIG. 14E]
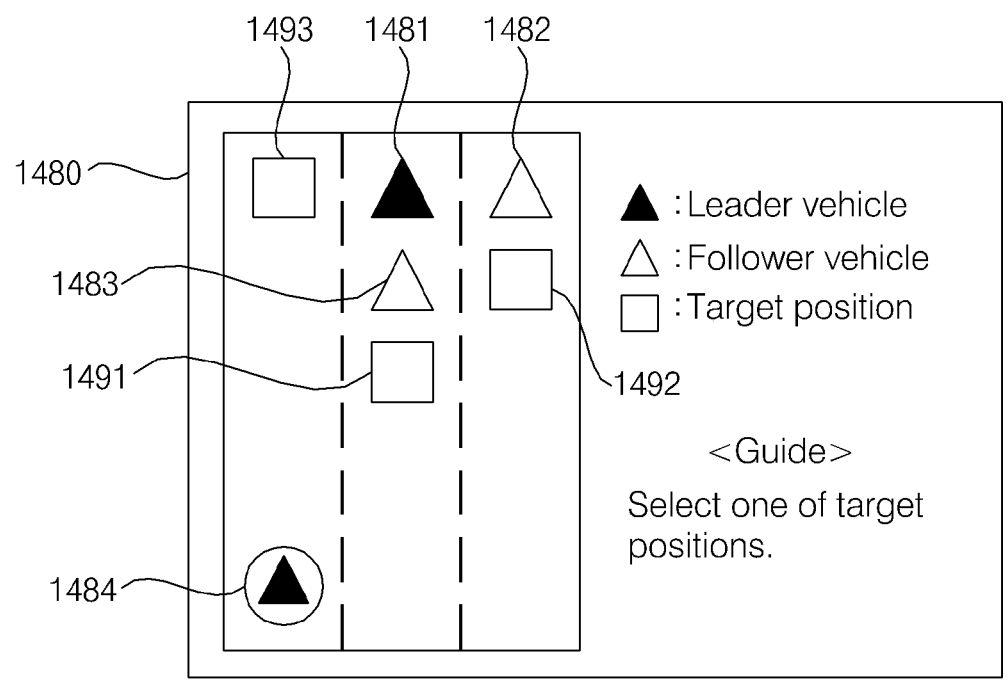

[FIG. 15]
S1500
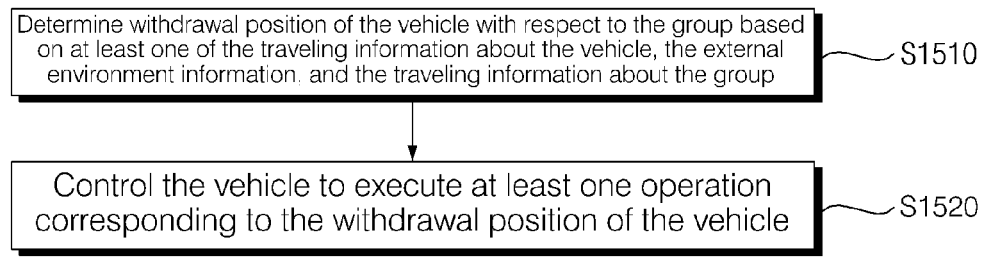
[FIG. 16]
S1600
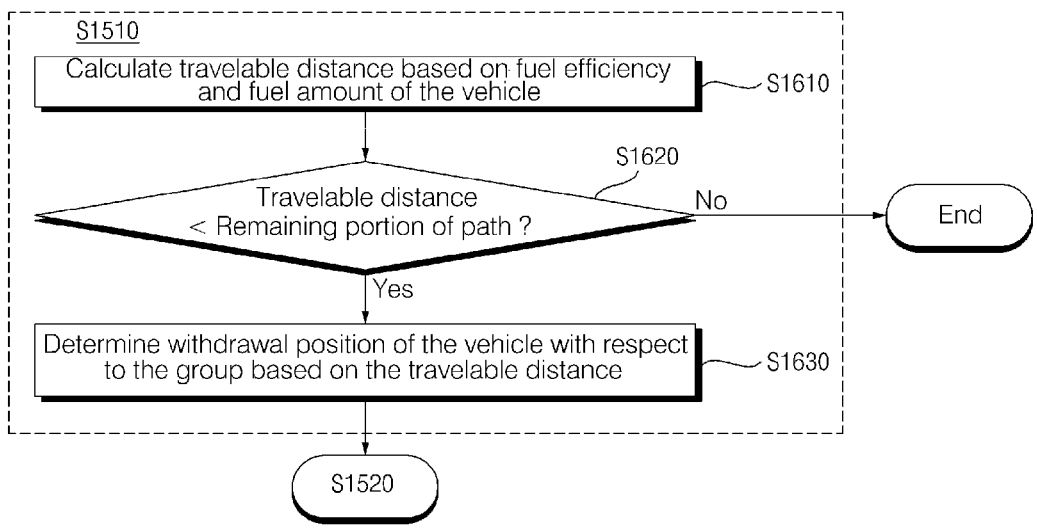

[FIG. 17]
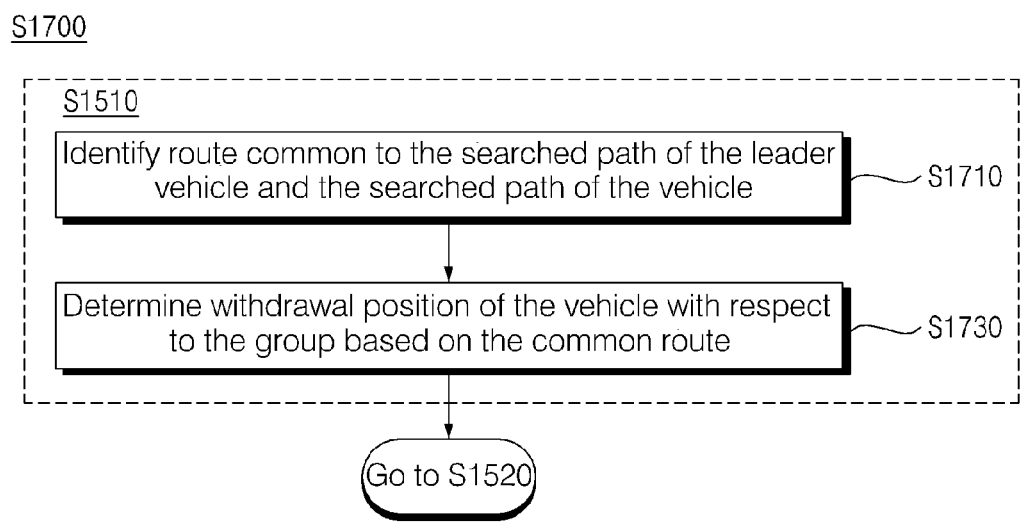

[FIG. 18A]
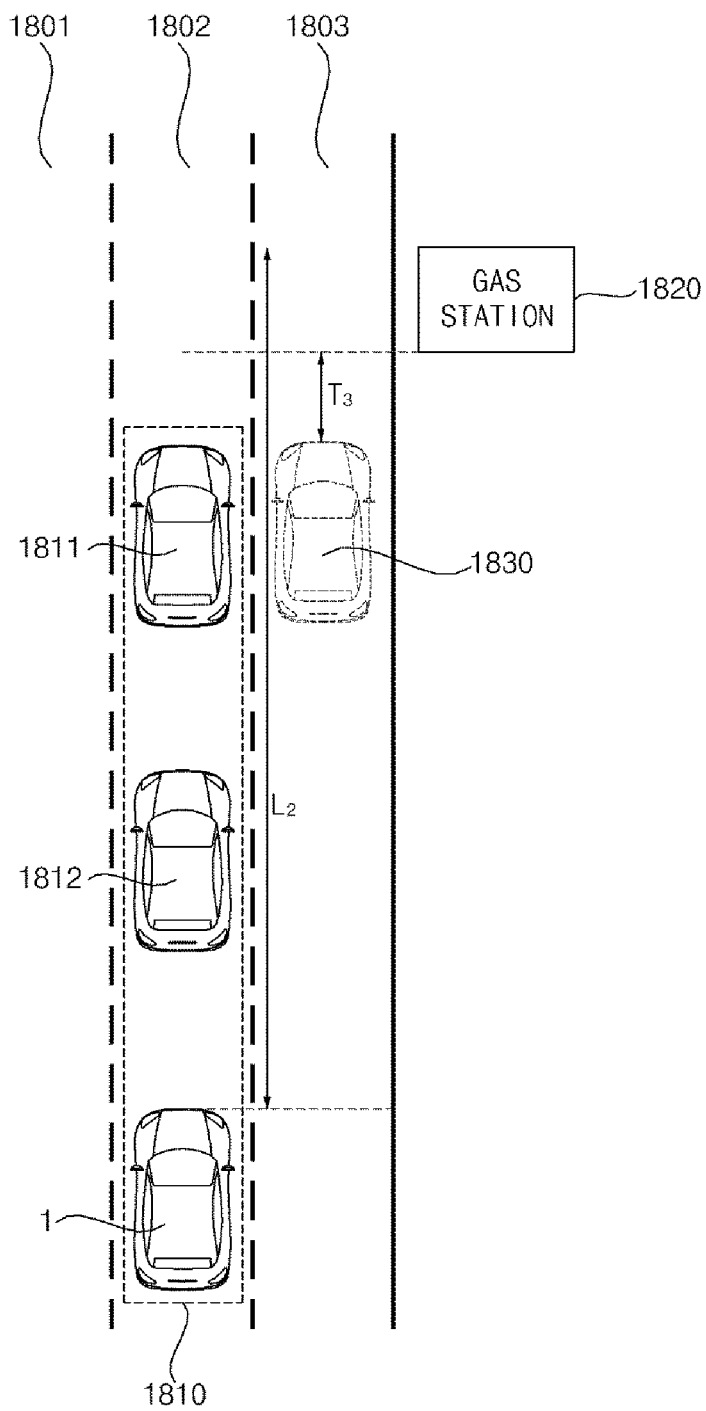

[FIG. 18B]
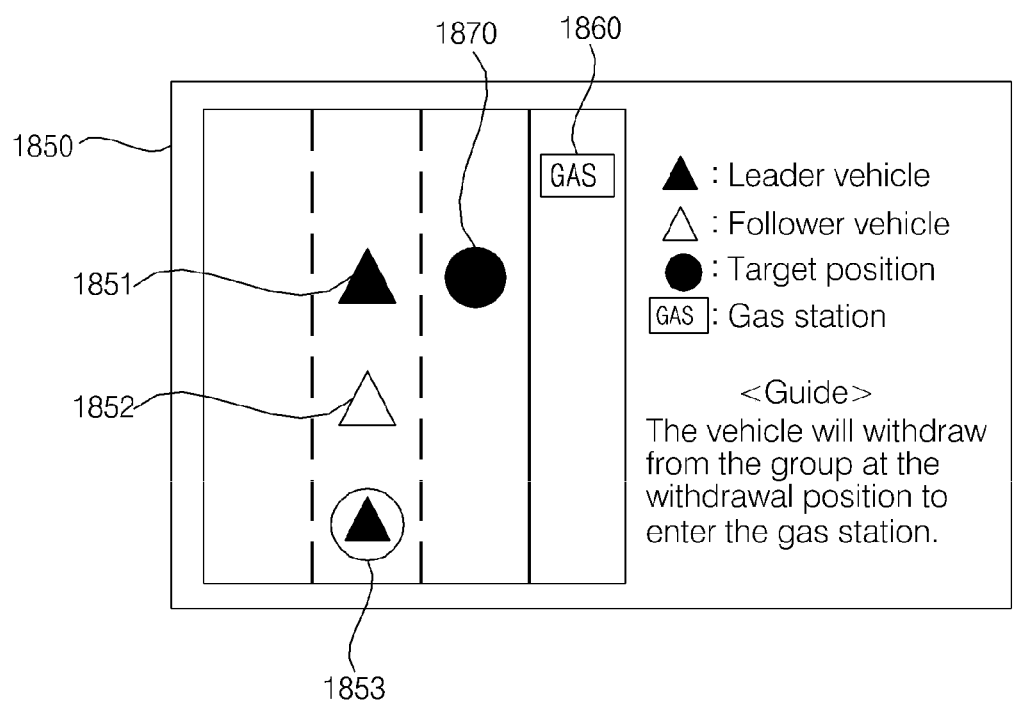

[FIG. 19A]
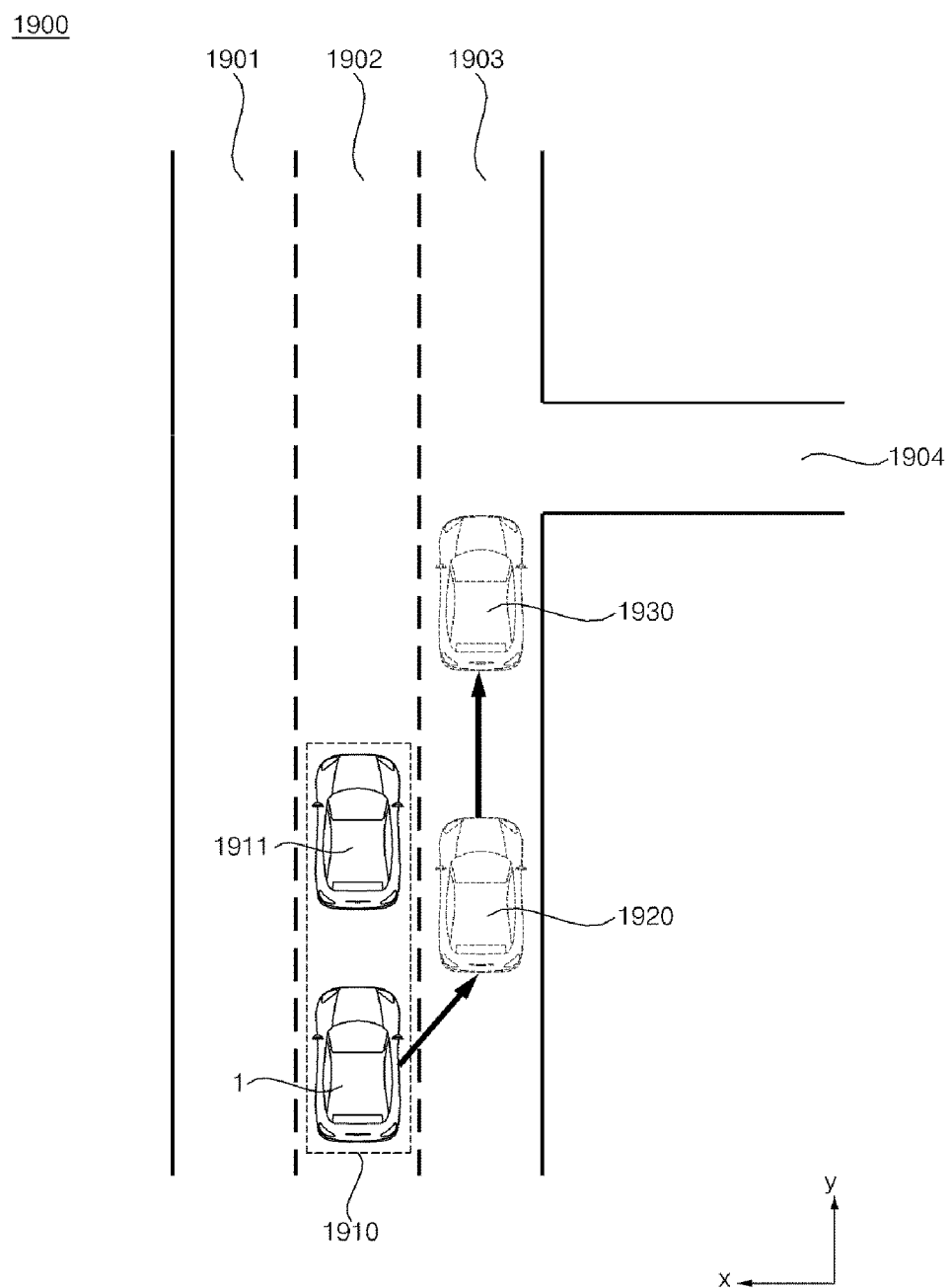

[FIG. 19B]
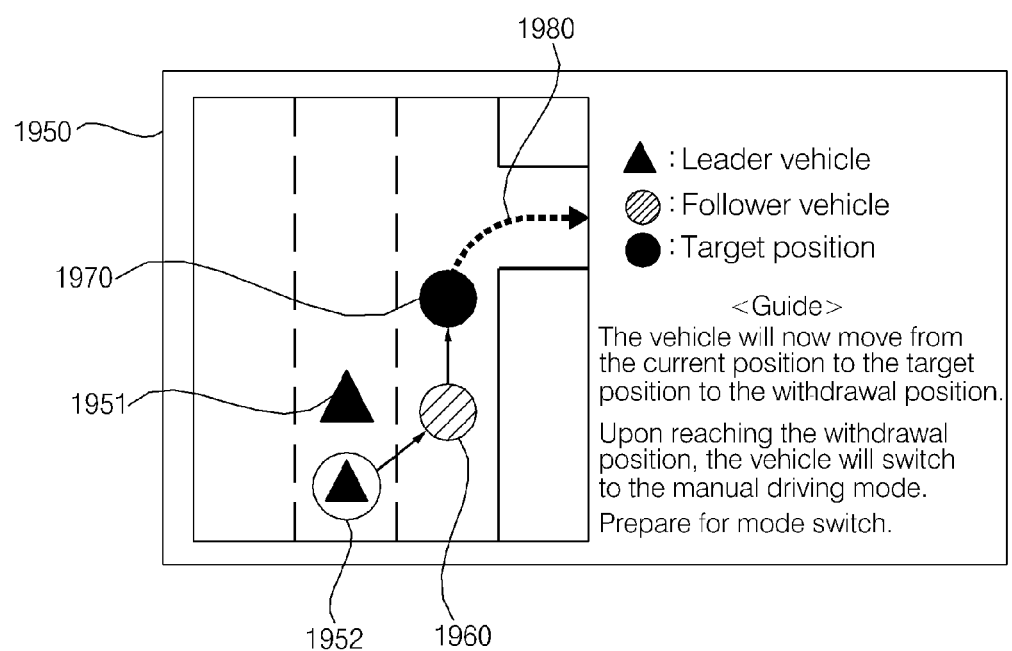

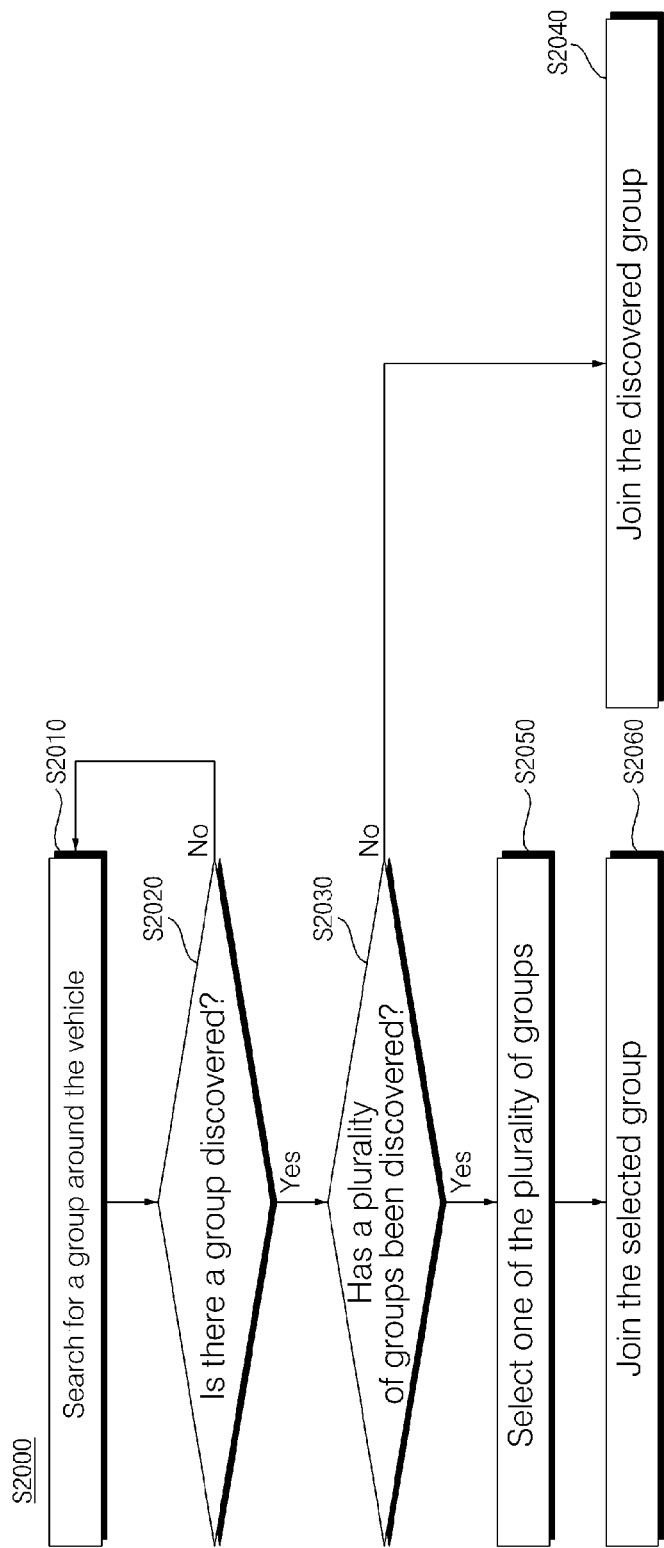
[FIG. 20]

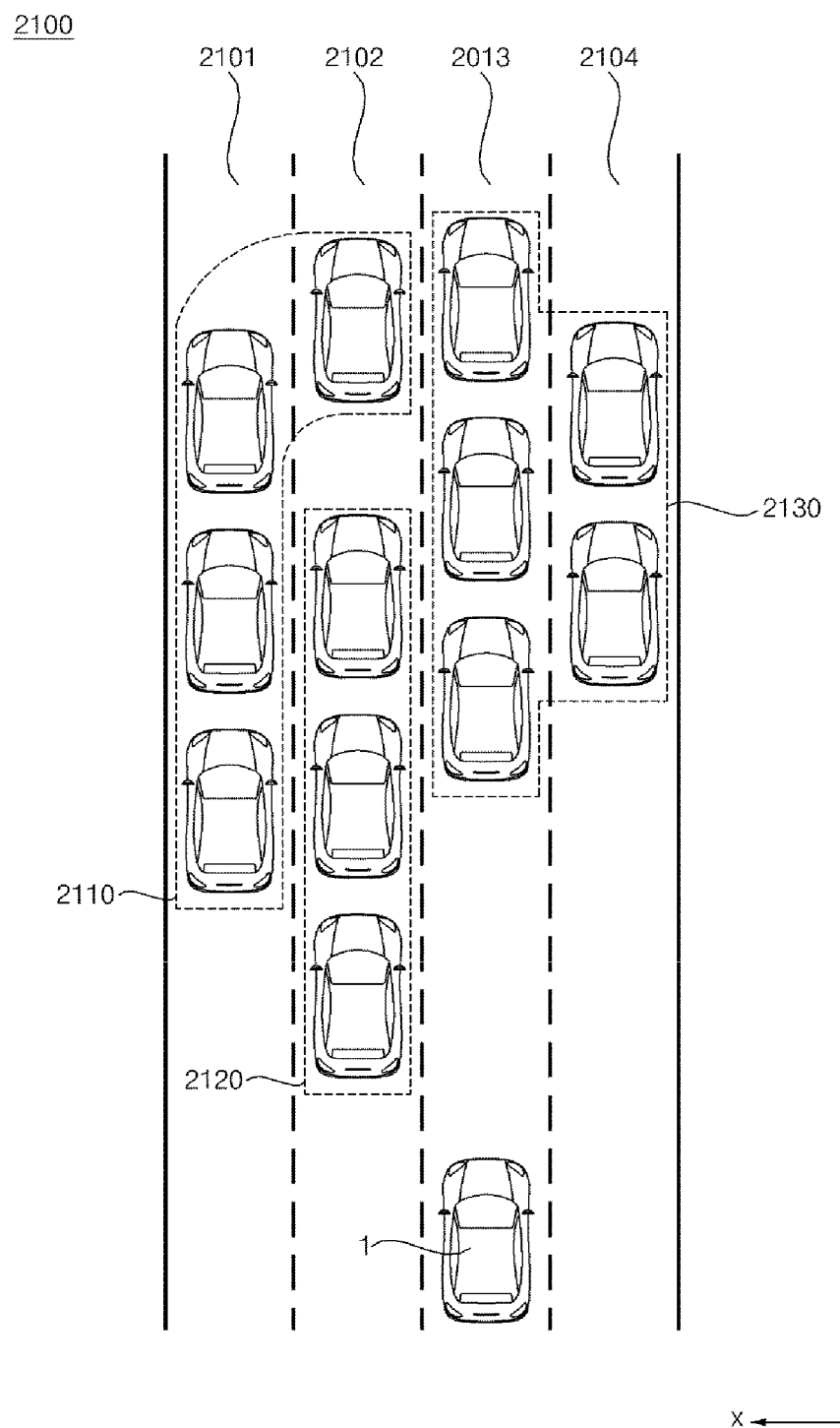
[FIG. 21]

[FIG. 22A]
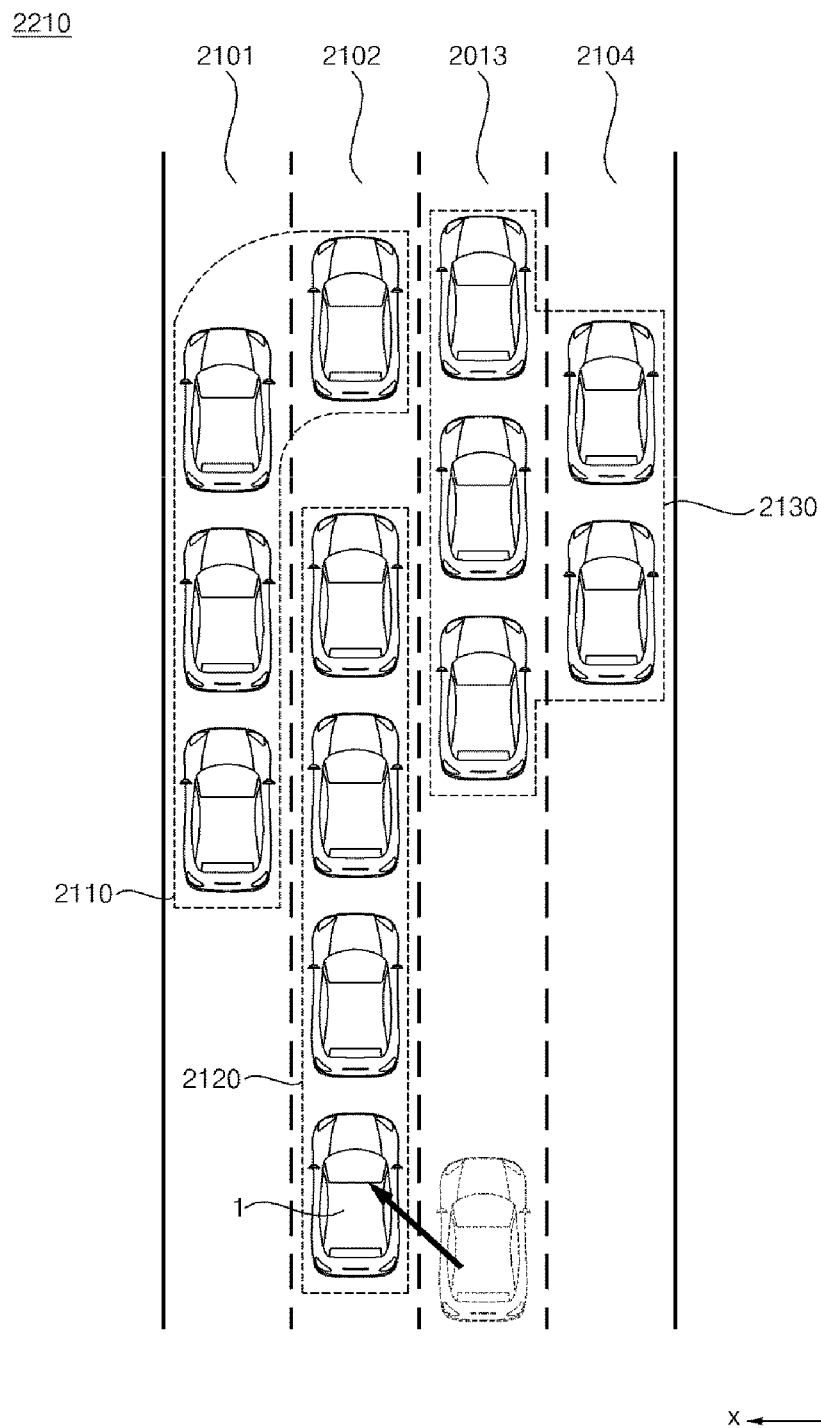

[FIG. 22B]
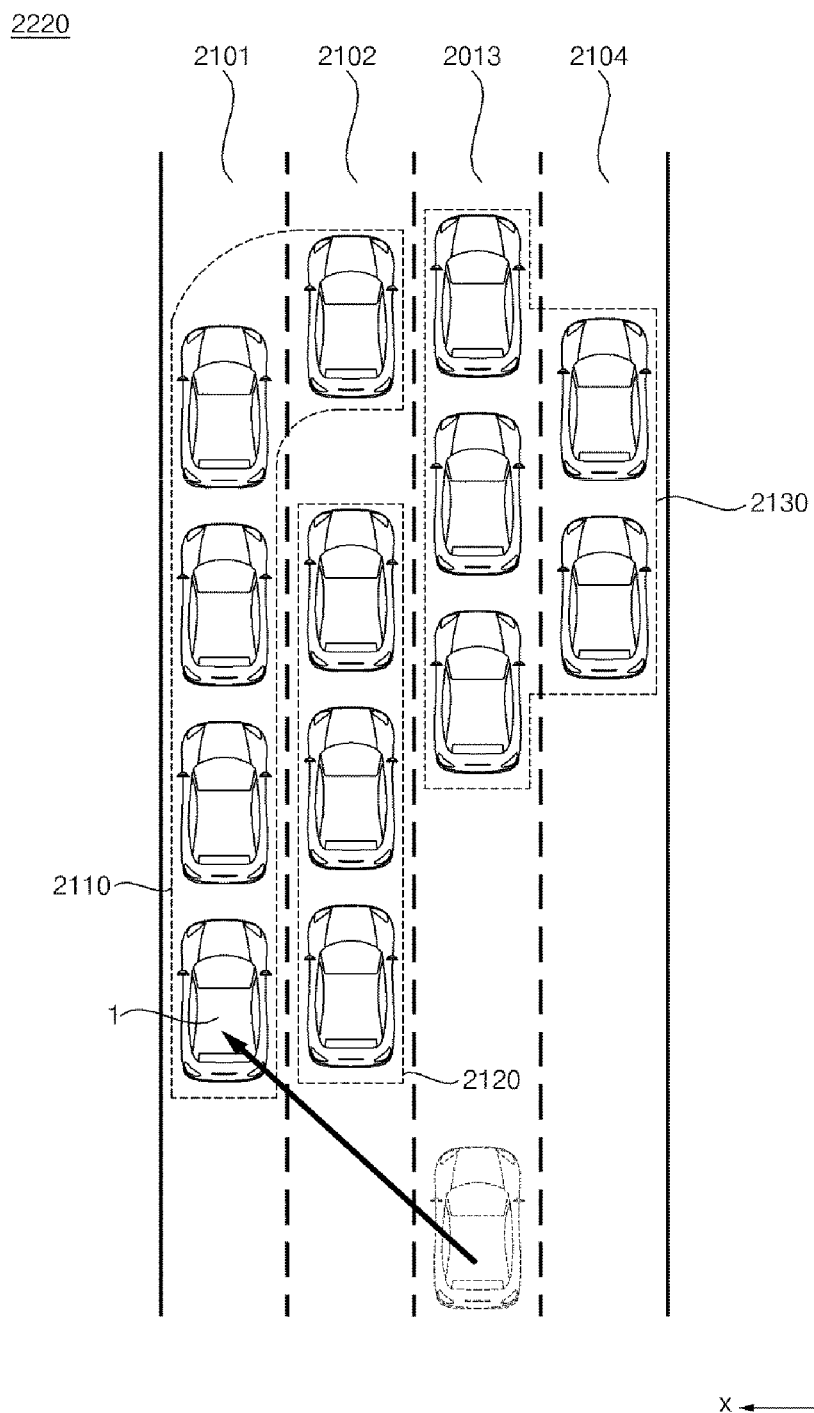

[FIG. 22C]
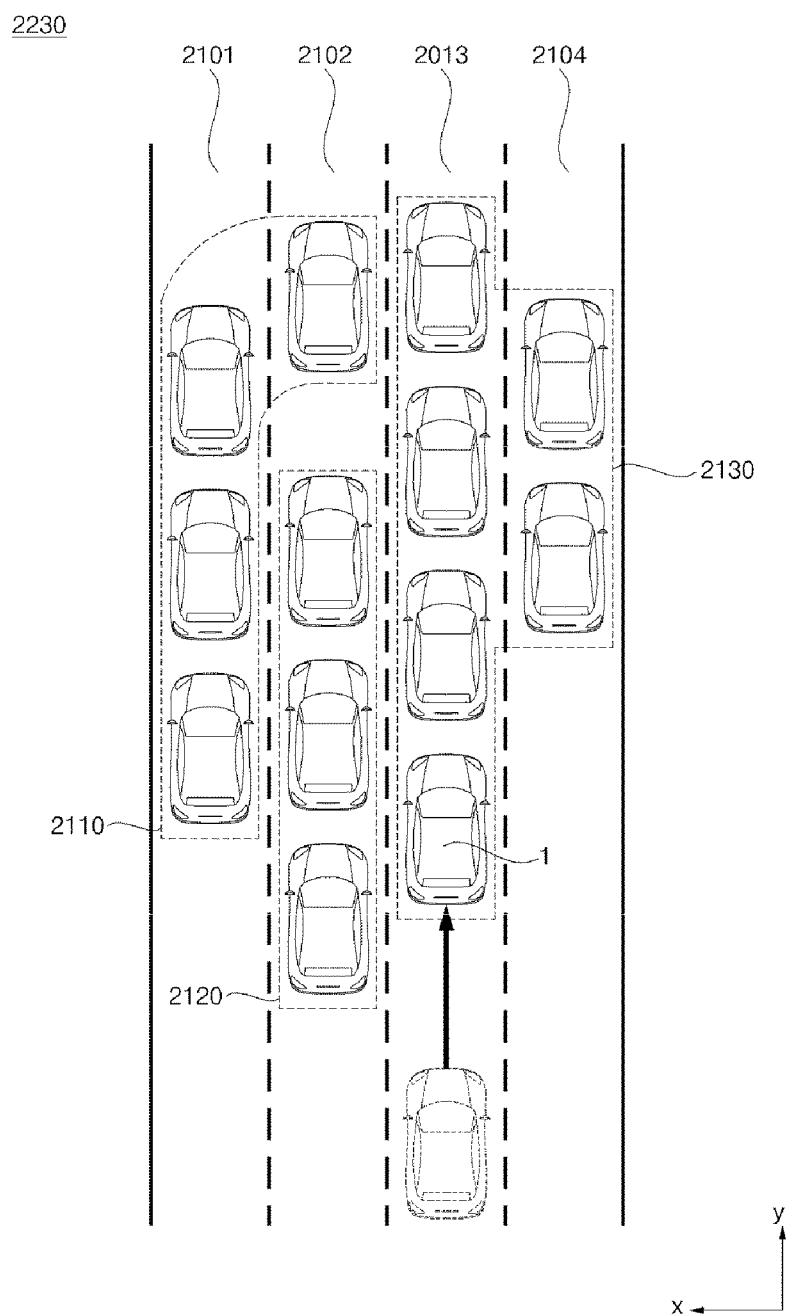

[FIG. 23]
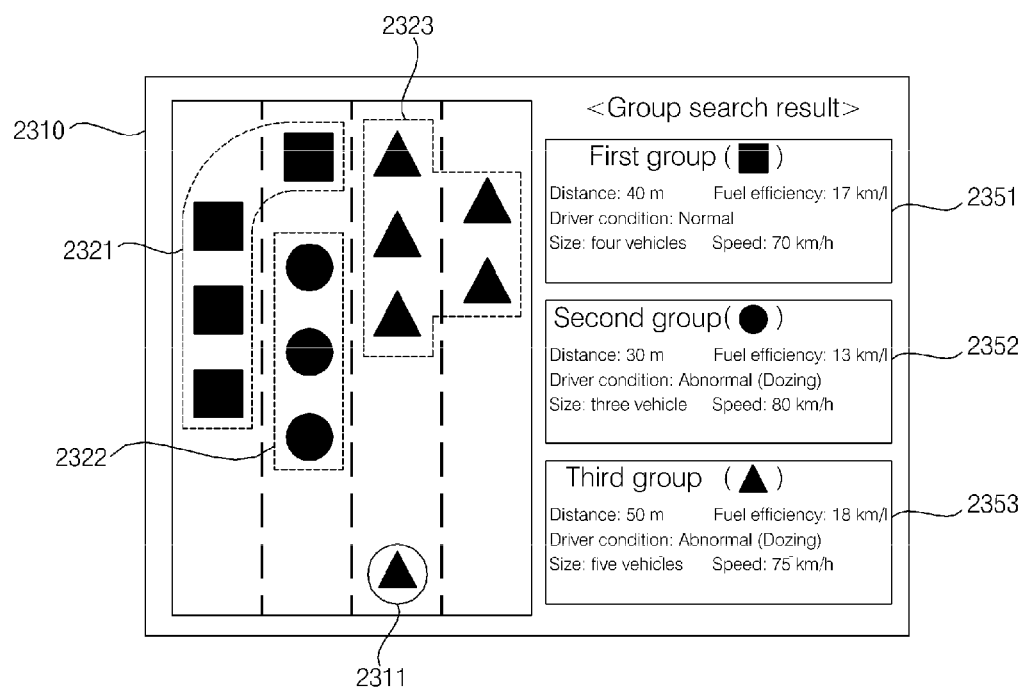

VEHICLE AND CONTROL METHOD THEREFOR

CROSS-REFERENCE TO RELATED APPLICATIONS

This application is a National Stage application under 35 U.S.C. § 371 of International Application No. PCT/KR2015/009002, filed Aug. 27, 2015, which claims the benefit of Korean Application No. 10-2015-0109602, filed on Aug. 3, 2015. The disclosures of the prior applications are incorporated by reference in their entirety.

TECHNICAL FIELD

The present invention relates to a vehicle and a method of operating the same, and more particularly, to a vehicle that performs group travel in an autonomous driving mode and a method of operating the same.

BACKGROUND ART

A vehicle refers to an apparatus that transports people or freight from one place to another by driving wheels. For example, the vehicle may include a two-wheeled vehicle such as a motorcycle, a four-wheeled vehicle such as a sedan, and even a train.

To enhance user safety and convenience in using vehicles, development of technologies for connecting various sensors and electronic devices to the vehicle has been accelerated. In particular, a system that provides various functions (e.g., smart cruise control, lane keeping assistance) developed to provide driving convenience to users has been employed in the vehicle. This enables autonomous driving in which the vehicle can autonomously travel on a road in consideration of the external environment, without requiring the driver's intervention.

In addition, as a conventional technology related to vehicles, the concept of group travel has been proposed. The group travel means that a plurality of vehicles bundled in one group shares traveling information with each other and travels on a road while considering the external environment.

One group includes a leader vehicle and follower vehicles. The leader vehicle is a vehicle that leads the group at the head of the group, and follower vehicles are vehicles that follow the leader vehicle.

The follower vehicles of the group can keep following the leader vehicle, using the traveling information (e.g., GPS coordinates, speed, path, direction, and braking information) about the leader vehicle transmitted through inter-vehicle communication or the like. Accordingly, the drivers of the follower vehicles can freely perform other actions (e.g., operation of a smartphone, sleeping) than driving inside the vehicles. Such group travel may enhance convenience for the drivers and improve transport efficiency.

However, the group travel technologies that have been introduced have a limitation in that all the vehicles in a group should be aligned in a line. For example, even if there is an empty lane on the road, the follower vehicles in the group must follow the leader vehicle only with the same lane as the leader vehicle.

Further, when an alien vehicle cuts into the group, follower vehicles behind the alien vehicle cannot follow the leader vehicle properly.

DISCLOSURE

Technical Problem

Therefore, the present invention has been made in view of the above problems, and it is an object of the present invention to provide a vehicle that can keep following a leader vehicle even in a lane different from the lane of the leader vehicle while performing group travel on a road including a plurality of lanes, and a control method therefor.

It is another object of the present invention to provide a vehicle which is capable of determining a suitable position for withdrawal from the group and moving to the determined position before withdrawing from the group when withdrawal is required, and a control method therefor.

It is another object of the present invention to provide a vehicle capable of easily selecting a group most suitable for the travel state of the vehicle among a plurality of groups which the vehicle can join and determining the position of the vehicle with respect to the selected group, and a control method therefor.

It is another object of the present invention to provide a vehicle capable of automatically switching between groups when a more suitable group is discovered around the vehicle during travel in a certain group, and a control method therefor.

Objects of the present invention are not limited to the aforementioned objects, and other objects of the present invention which are not mentioned above will become apparent to those having ordinary skill in the art upon examination of the following description.

Technical Solution

In accordance with an aspect of the present invention, the above and other objects can be accomplished by the provision of a vehicle including at least one sensor configured to acquire traveling information about the vehicle and external environment information about the vehicle, and a controller configured to receive traveling information about a first group, determine a target position of the vehicle with respect to the first group based on at least one of the traveling information about the vehicle, the external environment information, and the traveling information about the first group, and control the vehicle to execute at least one operation corresponding to the target position, wherein vehicles having joined the first group are traveling on a road including a plurality of lanes.

Other details of embodiments are included in the following detailed description and accompanying drawings.

Advantageous Effects

A vehicle and a control method therefor according to the present invention have the following effects.

According to at least one of the embodiments of the present invention, when the vehicle performs group travel on a road including a plurality of lanes, the vehicle can keep following a leader vehicle even in a lane different from the lane of the leader vehicle. Thereby, the distance from the leader vehicle may be minimized, and thus road efficiency may be enhanced. In addition, even if an alien vehicle cuts into the group, the possibility of missing the leader vehicle may be reduced.

According to at least one embodiment of the present invention, when withdrawal from a group is required, the vehicle can determine a position suitable for withdrawal and move to the determined position before withdrawing from the group.

According to at least one embodiment of the present invention, a group most suitable for the travel state of a vehicle can be easily selected from among a plurality of groups which the vehicle can join, the position of the vehicle with respect to the selected group can be automatically determined, and the vehicle can be moved to the determined position.

According to at least one embodiment of the present invention, when a more suitable group is discovered around the vehicle during travel in a certain group, is searched in a certain group, the groups can be automatically switched.

Effects of the present invention are not limited to the aforementioned effects, and other effects of the present invention which are not mentioned above will become apparent to those having ordinary skill in the art from the claims.

DESCRIPTION OF DRAWINGS

FIG. 1 is a block diagram illustrating a vehicle according to an embodiment of the present invention.

FIG. 2 shows an exemplary vehicle illustrated in FIG. 1.

FIG. 3 shows an exemplary vehicle illustrated in FIG. 1.

FIG. 4 shows an example of images generated by a plurality of cameras shown in FIG. 3.

FIG. 5 shows an internal block diagram of the controller shown in FIG. 1.

FIGS. 6A and 6B are views referred to in describing an operation of the controller shown in FIG. 5.

FIG. 7 is a flowchart illustrating an exemplary control method according to an embodiment of the present invention.

FIG. 8 is a flowchart illustrating an exemplary control method related to step S730 shown in FIG. 7.

FIG. 9 is a flowchart illustrating another exemplary control method related to step S730 shown in FIG. 7.

FIG. 10 is a flowchart illustrating another exemplary control method related to step S730 shown in FIG. 7.

FIG. 11 is a flowchart illustrating another exemplary control method related to step S730 shown in FIG. 7.

FIG. 12A is a view referred to in describing an operation of a vehicle according to an embodiment of the present invention.

FIG. 12B is a view referred to in describing an operation of the vehicle associated with the situation shown in FIG. 12A.

FIG. 12C is a view referred to in describing an operation of the vehicle associated with the situation shown in FIG. 12B.

FIG. 13A is a view referred to in describing an operation of a vehicle according to an embodiment of the present invention.

FIG. 13B is a view referred to in describing an operation of the vehicle associated with the situation shown in FIG. 13A.

FIG. 13C is a view referred to in describing an operation of the vehicle associated with the situation shown in FIG. 13A.

FIG. 14A is a view referred to in describing an operation of a vehicle according to an embodiment of the present invention.

FIG. 14B is a view referred to in describing an operation of the vehicle associated with the situation shown in FIG. 14A.

FIG. 14C is a view referred to in describing an operation of the vehicle associated with the situation shown in FIG. 14A.

FIG. 14D is a view referred to in describing an operation of the vehicle associated with the situation shown in FIG. 14A.

FIG. 14E is a view referred to in describing an operation of the vehicle associated with the situation shown in FIG. 14A.

FIG. 15 is a flowchart illustrating an exemplary control method according to an embodiment of the present invention.

FIG. 16 is a flowchart illustrating an exemplary control method related to step S1510 shown in FIG. 15.

FIG. 17 is a flowchart illustrating another exemplary control method related to step S1510 shown in FIG. 15.

FIG. 18A is a view referred to in describing an operation of a vehicle according to an embodiment of the present invention.

FIG. 18B is a view referred to in describing an operation of the vehicle associated with the situation shown in FIG. 18A.

FIG. 19A is a view referred to in describing an operation of a vehicle according to an embodiment of the present invention.

FIG. 19B is a view referred to in describing an operation of the vehicle associated with the situation shown in FIG. 19A.

FIG. 20 is a flowchart illustrating an exemplary control method according to an embodiment of the present invention.

FIG. 21 is a view referred to in describing an operation of a vehicle according to an embodiment of the present invention.

FIGS. 22A to 22C are views referred to in describing of an operation of the vehicle associated with the situation shown in FIG. 21.

FIG. 23 is a view referred to in describing an operation of the vehicle related to the situation shown in FIG. 21.

BEST MODE

Reference will now be made in detail to the preferred embodiments of the present invention, examples of which are illustrated in the accompanying drawings. Wherever possible, the same reference numbers will be used throughout the drawings to refer to the same or like parts, and redundant description of the parts will be omitted. As used herein, the suffixes "module" and "unit" are added or interchangeably used to facilitate preparation of this specification and are not intended to suggest distinguished meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents. Stating that one constituent "controls" another should also be understood as meaning not only a case where one constituent directly controls the other constituent, but also a case where one constituent controls the other constituent via a third component. In addition, stating that one constituent "provides" information or a signal to another should be understood as meaning not only a case where one constituent directly provides the information or signal to the other component, but also a case where one constituent provides the information or signal to the other component via a third component.

As used herein, the singular forms "a", "an", and "the" include plural referents unless context clearly dictates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The vehicle described in this specification may include a vehicle equipped with an internal combustion engine as a power source, a hybrid vehicle equipped with both an engine and an electric motor as a power source, and an electric vehicle equipped with an electric motor as a power source.

FIG. 1 is a block diagram illustrating a vehicle 1 according to an embodiment of the present invention.

The vehicle 1 may include a communication unit 110, an input unit 120, a memory 130, an output unit 140, a vehicle drive unit 150, a sensing unit 160, a controller 170, an interface unit 180, and a power unit 190.

The communication unit 110 may include at least one module enabling wireless communication between the vehicle 1 and an external device (e.g., a portable terminal, an external server, other vehicles). The communication unit 110 may also include at least one module for connecting the vehicle 1 to at least one network.

The communication unit 110 may include a broadcast reception module 111, a wireless Internet module 112, a short-range communication module 113, a location information module 114 and an optical communication module 115.

The broadcast reception module 111 receives a broadcast signal or broadcast-related information from an external broadcast management server over a broadcast channel. Herein, the broadcast includes radio broadcast or TV broadcast.

The wireless Internet module 112, which refers to a module for wireless Internet access, may be internally or externally installed to the vehicle 1. The wireless Internet module 112 is configured to transmit and receive a radio signal on a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long-Term Evolution (LTE), and Long-Term Evolution-Advanced (LTE-A). The wireless Internet module 112 transmits and receives data according to at least one of the aforementioned wireless Internet technologies. For example, the wireless Internet module 112 may wirelessly exchange data with the external server. The wireless Internet module 112 may receive weather information and traffic situation information (e.g., TPEG (Transport Protocol Experts Group)) from the external server.

The short-range communication module 113, which is provided for short-range communication, may support short-range communication using at least one of Bluetooth™ Radio Frequency Identification (RFID), Infrared Data Association (IrDA), Ultra-Wideband (UWB), ZigBee, Near Field Communication (NFC), Wi-Fi, Wi-Fi Direct, and Wireless Universal Serial Bus (Wireless USB) technologies.

The short-range communication module 113 may establish a wireless local area network to implement short-range communication between the vehicle 1 and at least one external device. For example, the short-range communication module 113 may wirelessly exchange data with the portable terminal of a user. The short-range communication module 113 may receive weather information, and traffic situation information (e.g., TPEG (Transport Protocol Experts Group)) from the portable terminal or an external server. For example, when a user enters the vehicle 1, the portable terminal of the user may be paired with the vehicle 1 automatically or by execution of an application by the user.

A typical exemplary location information module 114, which serves to acquire the location of the vehicle 1, is a global positioning system (GPS) module. For example, if the vehicle utilizes the GPS module, the location of the vehicle may be acquired using a signal from a GPS satellite.

The optical communication module 115 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal to the outside. For example, the light transmitter transmits a light signal by blinking a light emitting device at a predetermined frequency. According to some embodiments, the light transmitter may include an array of a plurality of light emitting devices. According to some embodiments, the light transmitter may be integrated with a lamp provided to the vehicle 1. For example, the light transmitter may be at least one of a headlight, a taillight, a brake light, a turn signal lamp and a sidelight. For example, the optical communication module 115 may exchange data with another vehicle through optical communication.

The input unit 120 may include a driving manipulation means 121, a microphone 123 and a user input unit 124.

The driving manipulation means 121 receives user input for driving the vehicle 1. The driving manipulation means 121 may include a steering input means 121a, a shift input means 121b, an acceleration input means 121c, and a brake input means 121d.

The steering input means 121a receives a travel direction input of the vehicle 1 from the user. The steering input means 121a may include a steering wheel. According to some embodiments, the steering input means 121a may include a touchscreen, a touch pad, or a button.

The shift input means 121b receives, from the user, inputs for Park (P), Drive (D), Neutral (N) and Reverse (R) of the vehicle 1. Preferably, the shift input means 121b is formed in the shape of a lever. According to some embodiments, the shift input means 121b may include a touchscreen, a touch pad, or a button.

The acceleration input means 121c receives an input for accelerating the vehicle 1 from the user. The brake input means 121d receives an input for decelerating the vehicle 1 from the user. Preferably, the acceleration input means 121c and the brake input means 121d are formed in the shape of a pedal. According to some embodiments, the acceleration input means 121c or the brake input means 121d may include a touchscreen, a touch pad, or a button.

The microphone 123 may process a sound signal from the outside to create electrical data. The data created through processing may be utilized for various purposes according to functions being executed by the vehicle 1. The microphone 123 may convert a voice command from the user into electrical data. The electrical data may be delivered to the controller 170.

According to an embodiment, the camera 122 or the microphone 123 may be a constituent included in the sensing unit 160 rather than in the input unit 120.

The user input unit 124 serves to receive information input by the user. When information is input through the user input unit 124, the controller 770 may control operation of the vehicle 1 in accordance with the input information. The user input unit 124 may include a touch input means or a mechanical input means. According to some embodiments, the user input unit 124 may be disposed in one area of the steering wheel. In this case, the driver may manipulate the user input unit 124 with fingers while holding the steering wheel.

The input unit 120 may include a plurality of buttons or touch sensors. Various input operations may be performed through the plurality of buttons or touch sensors.

The sensing unit 160 senses a signal related to traveling of the vehicle 1. To this end, the sensing unit 160 may include a collision sensor, a steering sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, an interior temperature sensor, an interior humidity sensor, an ultrasonic sensor, an infrared sensor, radar, and lidar.

Thereby, the sensing unit 160 may acquire vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information, and a sensing signal for sensing an angle by which the steering wheel is rotated. In addition, the controller 170 may generate a control signal for acceleration, deceleration and change of the drive direction of the vehicle 1 based on the external environment information acquired by at least one of the camera, ultrasonic sensor, infrared sensor, radar and lidar which are installed in the vehicle 1. Herein, the external environment information may be information related to various objects positioned within a predetermined distance from the vehicle 1 during driving. For example, the external environment information may include information on the number of objects positioned within 100 m from the vehicle 1, the sizes of the objects, types of the objects and the like.

The sensing unit 160 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 160 may include a biometric identification information sensing unit. The biometric identification information sensing unit senses and acquires biometric identification information about an occupant. The biometric identification information may include fingerprint information, iris-scan information, retina-scan information, hand geometry information, facial recognition information, and voice recognition information. The biometric identification information sensing unit may include a sensor for sensing biometric identification information about a person in the vehicle. Here, the camera 162 and the microphone 123 may operate as sensors. The biometric information sensing unit may acquire the hand geometry information and the facial recognition information through the camera 162.

The sensing unit 160 may include at least one camera 161 for capturing an image of the outside of the vehicle 1. For example, the sensing unit 160 may include a plurality of cameras 161 disposed at different positions on the exterior of the vehicle. The camera 161 may include an image sensor (e.g., CMOS or CCD) and an image processing module. The camera 161 may process a still image or a moving image obtained by the image sensor. The image processing module may process the still image or moving image acquired through the image sensor, thereby extracting necessary information and delivering the extracted information to the controller 170.

The sensing unit 160 may include at least one camera 162 for photographing the interior of the vehicle 1. For example, the camera 162 may generate an image including an occupant of the vehicle 1, and then provide the image to the controller 170.

The cameras 161 and 162 may include an image sensor (e.g., CMOS or CCD) and an image processing module. The cameras 161 and 162 may process a still image or a moving image obtained by the image sensor. The image processing module may process the still image or moving image acquired through the image sensor. In addition, the cameras 161 and 162 may acquire an image including at least one of a traffic light, a traffic signboard, a pedestrian, another vehicle and a road surface.

The output unit 140, which serves to output information processed by the controller 170, may include a display unit 141, a sound output unit 142 and a haptic output unit 143.

The display unit 141 may display information processed by the controller 170. For example, the display unit 141 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 141 may include at least one of a liquid crystal display (LCD), a thin film transistor-liquid crystal display (TFT LCD), an organic light-emitting diode (OLED) display, a flexible display, a 3D display, and an e-ink display.

The display unit 141 may form a layered architecture together with a touch sensor or be integrated with the touch sensor, thereby implementing a touchscreen. Such touchscreen may function as the user input unit 124 providing an input interface between the vehicle 1 and the user and also as an output interface between the vehicle 1 and the user. In this case, the display unit 141 may include a touch sensor for sensing touch applied to the display unit 141 in order to receive a control command in a touch manner. Thereby, when the display unit 141 is touched, the touch sensor may sense the touch, and the controller 170 may generate a control command corresponding to the touch. Content input through touch may include characters, numbers, or menu items which can be indicated or specified in various modes.

Meanwhile, the display unit 141 may include a cluster to allow the driver to check the vehicle condition information or vehicle driving information during driving. The cluster may be positioned on the dashboard. In this case, the driver can check the information displayed on the cluster while looking forward of the vehicle.

According to some embodiments, the display unit 141 may be implemented as a head up display (HUD). If the display unit 141 is implemented as the HUD, information may be output through a transparent display provided to the windshield. Alternatively, the display unit 141 may be provided with a projection module, thereby outputting information through an image projected onto the windshield.

The sound output unit 142 converts an electrical signal from the controller 170 into an audio signal and outputs the audio signal. To this end, the sound output unit 142 may be provided with a speaker. The sound output unit 142 may output sound corresponding to operation of the user input unit 124.

The haptic output unit 143 generates haptic output. For example, the haptic output unit 143 may vibrate the steering wheel, a seat belt and a seat to allow the user to recognize the output.

The vehicle drive unit 150 may control operation of various vehicular devices. The vehicle drive unit 150 may include at least one of a power source drive unit 151, a steering drive unit 152, a brake drive unit 153, a lamp drive unit 154, an air conditioning drive unit 155, a window drive unit 156, an airbag drive unit 157, a sunroof drive unit 158 and a wiper drive unit 159.

The power source drive unit 151 may perform electronic control of the power source in the vehicle 1. The power source drive unit 151 may include an accelerator for increasing the speed of the vehicle 1 and a decelerator for decreasing the speed of the vehicle 1.

For example, if a fossil fuel-based engine (not shown) is the power source, the power source drive unit 151 may perform electric control of the engine. Thereby, the output torque of the engine may be controlled. If the power source drive unit 151 is an engine, the output torque of the engine may be controlled by the controller 170 to limit the speed of the vehicle.

As another example, if an electric motor (not shown) is the power source, the power source drive unit 151 may control the motor. Thereby, the rotational speed and torque of the motor may be controlled.

The steering drive unit 152 may include a steering apparatus. Thereby, the steering drive unit 152 may perform electronic control of the steering apparatus in the vehicle 1. For example, the steering drive unit 152 may include a steering torque sensor, a steering angle sensor and a steering motor. The steering torque which the driver applies to the steering wheel 12 may be sensed by the steering torque sensor. The steering drive unit 152 may control the steering force and steering angle by changing the magnitude and direction of electric current applied to the steering motor based on the speed of the vehicle 1 and the steering torque. In addition, the steering drive unit 152 may determine whether or not the travel direction of the vehicle is properly controlled, based on the steering angle information acquired by the steering angle sensor. Thereby, the steering drive unit 152 can change the travel direction of the vehicle. In addition, when the vehicle travels at a low speed, the steering drive unit 152 may lower the resistance of the steering wheel 12 by increasing the steering force of the steering motor. When the vehicle 1 travels at a high speed, the steering drive unit 152 may increase the resistance of the steering wheel 12 by reducing the steering force of the steering motor. If the autonomous travel function of the vehicle 1 is executed, the steering drive unit 152 may control the steering motor to produce appropriate steering force based on a sensing signal output by the sensing unit 160 or a control signal provided by the controller 170 even if the driver manipulates the steering wheel 12 (e.g., even if the steering torque is not sensed).

The brake drive unit 153 may perform electronic control of a brake apparatus (not shown) in the vehicle 1. For example, by controlling the operation of the brakes disposed on the wheels, the speed of the vehicle 1 may be reduced. In another example, the brake disposed on a left wheel may be operated differently from the brake disposed on a right wheel in order to adjust the travel direction of the vehicle 1 to the left or right.

The lamp drive unit 154 may control at least one lamp disposed inside or outside the vehicle to be turned on/off. The lamp drive unit 154 may include a lamp device. In addition, the lamp drive unit 154 may control the intensity and direction of light emitted from each lamp included in the lamp device. For example, the lamp drive unit 154 may control a turn signal lamp, a headlamp, and a brake lamp.

The air conditioning drive unit 155 may perform electronic control of an air conditioner (not shown) in the vehicle 1. For example, if the temperature of the interior of the vehicle is high, the air conditioning drive unit 155 may control the air conditioner to supply cool air to the interior of the vehicle.

The window drive unit 156 may perform electronic control of a window apparatus in the vehicle 1. For example, the window drive unit 156 may control opening or closing of the left and right windows on both sides of the vehicle.

The airbag drive unit 157 may perform electronic control of an airbag apparatus in the vehicle 1. For example, the airbag drive unit may control the airbag apparatus such that the airbags are inflated when the vehicle is exposed to danger.

The sunroof drive unit 158 may perform electronic control of a sunroof apparatus (not shown) in the vehicle 1. For example, the sunroof drive unit 158 may control opening or closing of the sunroof.

The wiper drive unit 159 may control wipers 14a and 14b provided to the vehicle 1. For example, when the wiper drive unit 159 receives, from the user input unit 124, user input commanding the wiper drive unit 159 to drive the wipers, the wiper drive unit 159 may perform electronic control of the number of driving times and driving speed of the wipers 14a and 14b according to user input. As another example, the wiper drive unit 159 may automatically drive the wipers 14a and 14b without any user input by determining the amount and intensity of rain based on a sensing signal from a rain sensor included in the sensing unit 160.

Meanwhile, the vehicle drive unit 150 may further include a suspension drive unit (not shown). The suspension drive unit may perform electronic control of a suspension apparatus (not shown) in the vehicle 1. For example, when a road surface is uneven, the suspension drive unit may control the suspension apparatus to attenuate vibration of the vehicle 1.

The memory 130 is electrically connected to the controller 170. The memory 130 may store basic data for each unit, control data for controlling operation of each unit, and input/output data. When implemented through hardware, the memory 130 may include various storage devices such as a ROM, RAM, EPROM, flash drive, and hard drive. The memory 130 may store various kinds of data for overall operation of the vehicle 1 including a program for processing or controlling operation of the controller 170.

The interface unit 180 may serve as a path between the vehicle 1 and various kinds of external devices connected thereto. For example, the interface unit 180 may be provided with a port connectable to the portable terminal, thus being connected to the portable terminal through the port. In this case, the interface unit 180 may exchange data with the portable terminal.

The interface unit 180 may receive turn signal information. Here, the turn signal information may be a signal for turning on a turn signal lamp for left turn or right turn input by the user. When an input for turning on the left or right turn signal lamp is received through the user input unit 724 (see FIG. 6) of the vehicle, the interface unit 180 may receive the left or right turn signal information.

The interface unit 180 may receive vehicle speed information, rotation angle information of the steering wheel or gearshift information. The interface unit 180 may receive the vehicle speed information, rotation angle information on the steering wheel or gearshift information sensed through the sensing unit 160 of the vehicle. Alternatively, the interface unit 180 may receive the vehicle speed information, rotation angle information of the steering wheel or gearshift information from the controller 170 of the vehicle. Here, the gearshift information may be information about the position at which the gearshift of the vehicle is placed. For example, the gearshift information may be information about the position of the gearshift lever among Park (P), Reverse (R), Neutral (N), Drive (D), and first to higher gear stages.

The interface unit 180 may receive a user input which is input through the user input unit 124 of the vehicle 1. The interface unit 180 may receive the user input from the input unit 120 of the vehicle 1 or via the controller 170.

The interface unit 180 may receive information acquired from an external device. For example, when change-of-traffic light information is received from an external device through the communication unit 520 of the vehicle 1, the interface unit 180 may receive the change-of-traffic light information from the controller 170.

The controller 170 may control overall operations of the respective units in the vehicle 1. The controller 170 may be called an electronic control unit (ECU).

The controller 170 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for performing other functions.

The power unit 190 may be controlled by the controller 170 to supply electric power necessary for operation of respective constituents. In particular, the power unit 170 may receive power from, for example, a battery (not shown) in the vehicle.

The AVN (audio video navigation) apparatus 400 can exchange data with the controller 170. The controller 170 may receive navigation information from the AVN apparatus or a separate navigation apparatus (not shown). Here, the navigation information may include set destination information, path information according to the destination, map information, or vehicle location information, wherein the map information and the vehicle location information are related to traveling of the vehicle.

Some of the constituents shown in FIG. 1 may not be essential in implementing the vehicle 1. Accordingly, the vehicle described in this specification may have more or fewer constituents than the constituents listed above.

FIG. 2 shows an exemplary vehicle 1 described above with reference to FIG. 1. For simplicity, it is assumed that the vehicle 1 is a four-wheeled automobile.

Referring to FIG. 2, the vehicle 1 may include at least one of radar 201, lidar 202 and an ultrasonic sensor 203.

The radar 201 may be installed on one side of the vehicle 1, emit an electromagnetic wave to the surroundings of the vehicle 1 and receive an electromagnetic wave reflected from various objects present around the vehicle 1. For example, the radar 201 may measure time taken for the electromagnetic wave to return after being reflected from an object, thereby acquiring information related to the distance, direction and altitude of the object.

The lidar 202 is installed on one side of the vehicle 1 to emit lasers toward the surroundings of the vehicle 1. Lasers emitted from the lidar 202 may return to the vehicle 1 after being scattered or reflected, and the lidar 202 may acquire information about physical properties such as the distance, speed, and shape of a target positioned near the vehicle 1, based on the time taken for the lasers to return, laser intensity, change in frequency and change in polarization.

The ultrasonic sensor 203 may be installed on one side of the vehicle 1 to emit ultrasound toward the surroundings of the vehicle 1. The ultrasound generated by the ultrasonic sensor 203 has a high frequency (higher than or equal to 20 KHz) and a short wavelength. The ultrasonic sensor 203 may be used to recognize an obstacle close to the vehicle 1.

The radar 201, lidar 202 and ultrasonic sensor 203 shown in FIG. 2 may be sensors included in the sensing unit 160 shown in FIG. 1.

FIG. 3 shows another exemplary vehicle 1 described above with reference to FIG. 1. For simplicity, suppose that the vehicle 1 is a four-wheeled automobile.

Referring to FIG. 3, four cameras 301, 302, 303 and 304 may be mounted at different positions on the exterior of the vehicle 1.

The plurality of cameras 301, 302, 303 and 304 may be disposed at the front, left, right, and back of the vehicle 1, respectively. Each of the plurality of cameras 301, 302, 303, 304 may correspond to the camera 161 shown in FIG. 1.

The front camera 301 may be disposed near the windshield, emblem or radiator grille.

The left camera 302 may be disposed in a case surrounding the left side-view mirror. Alternatively, the left camera 302 may be disposed on the exterior of the case surrounding the left side-view mirror. Alternatively, the left camera 302 may be disposed in one outer area of the left front door, left rear door or left fender.

The right camera 303 may be disposed in a case surrounding the right side-view mirror. Alternatively, the right camera 303 may be disposed on the exterior of the case surrounding the right side-view mirror. Alternatively, the right camera 303 may be disposed in one outer area of the right front door, right rear door or right fender.

The rear camera 304 may be disposed near the rear license plate or trunk switch.

Images captured by the plurality of cameras 301, 302, 303 and 304 may be delivered to the controller 170, and the controller 170 may synthesize the images to generate an image of the surroundings of the vehicle.

Each of the cameras 301, 302, 303 and 304 shown in FIG. 3 may be identical to the camera 161 of the sensing unit 160 shown in FIG. 1.

While FIG. 3 illustrates four cameras as being installed on the exterior of the vehicle 1, embodiments of the present invention are not limited thereto. It is apparent to those skilled in the art that more or less than four cameras may be installed at positions different from the positions shown in FIG. 3.

FIG. 4 shows an example of images generated by the plurality of cameras 301, 302, 303 and 304 shown in FIG. 3.

Referring to FIG. 4, a synthetic image 400 may include a first image area 401 captured by the front camera 301, a second image area 402 captured by the left camera 302, a third image area 403 captured by the right camera 303, and a fourth image area 404 captured by the rear camera 304. The synthetic image 400 may be referred to as an around view monitoring image.

When the synthetic image 400 is created, boundary lines 411, 412, 413 and 414 are produced between any two images. Such boundary parts may be processed through image blending to look natural when they are displayed.

Meanwhile, the boundary lines 411, 412, 413 and 414 may be displayed on the respective boundaries between the images. In addition, a preset image indicating the vehicle 1 may be included in the middle of the synthetic image 400.

The synthetic image 400 may be displayed through a display apparatus installed in the interior of the vehicle 1.

The controller 170 may generate vehicle-related information by signal-processing the images received from the cameras 161 and 162 shown in FIG. 1, based on computer vision. Here, the vehicle-related information may include vehicle control information for direct control of the vehicle or vehicle driving assistance information for assisting the driver in driving. Here, the cameras 161 and 162 may be mono cameras or stereo cameras.

The memory 130 may store programs and various data for processing or control in the controller 170.

The memory 130 may store data for identifying an object. For example, if a predetermined object is detected in the images acquired through the cameras 161 and 162, the memory 130 may store data for identifying the object through a predetermined algorithm.

The memory 130 may store data for traffic information. For example, if predetermined traffic information is detected in the images acquired through the camera 161 and 162, the memory 130 may store data for identifying the traffic information through a predetermined algorithm.

When implemented in hardware, the memory 130 may include various storage devices such as a ROM, RAM, EPROM, flash drive, and hard drive.

The controller 170 may process front view images or surroundings view images of the vehicle acquired by the cameras 161 and 162. In particular, the controller 170 performs signal processing based on computer vision. Thereby, the controller 170 may acquire images of the front view or surroundings of the vehicle from the cameras 161 and 162, and may detect and track an object based on the images. In particular, in detecting an object, the controller 170 may perform lane detection (LD), vehicle detection (VD), pedestrian detection (PD), bright spot detection (BD), traffic sign recognition (TSR), and road surface detection.

A traffic sign may represent predetermined information which can be delivered to the driver of the vehicle 1. The traffic sign may be delivered to the driver through a traffic light, a traffic signboard or a road surface. For example, the traffic sign may be a Go or Stop signal output from a traffic light for vehicles or pedestrians. For example, the traffic sign may include various designs or text marked on traffic signboards. For example, the traffic sign may include various designs or text marked on the road surface.

The controller 170 may detect information in an image of the surroundings of the vehicle generated by the cameras 161 and 162.

The information may be information about the travel situation of the vehicle. For example, the information may include information on the road on which the vehicle travels, traffic law information, nearby vehicle information, vehicle or pedestrian traffic light information, construction information, traffic situation information, parking lot information, and lane information.

The controller 170 may detect traffic information from at least one of the traffic light, traffic signboards and road surface included in images acquired by the cameras 161 and 162. For example, the controller 170 may detect a Go or Stop signal for vehicles or pedestrians from the traffic light included in the image. For example, the controller 170 may detect various kinds of designs or text on a traffic signboard included in the image. For example, the controller 170 may detect various kinds of designs or text on a road surface included in the images.

The controller 170 may compare the detected information with the information stored in the memory 130 to identify the information.

For example, the controller 170 detects a design or text indicating a ramp from an object included in an acquired image. Herein, the object may be a traffic signboard or a road surface. The controller 170 may compare the traffic information stored in the memory 130 with the detected design or text, thereby recognizing the ramp information.

For example, the controller 170 detects a design or text indicating a stop sign for vehicles or pedestrians from an object included in the acquired image. Herein, the object may be a traffic signboard or a road surface. The controller 170 may recognize the Stop information by comparing the traffic information stored in the memory 130 with the detected design or text. Alternatively, the controller 170 detects a stop line on a road surface included in the acquired image. The controller 170 may recognize the stop information by comparing the traffic information stored in the memory 130 with the stop line.

For example, the controller 170 may detect presence or absence of a lane from an object included in the acquired image. Herein, the object may be a road surface. The controller 170 may check the color of the detected lane. The controller 170 may check whether the detected lane is a drive through lane or a turn lane.

For example, the controller 170 may detect Go or Stop information for vehicles from an object included in the acquired image. Here, the object may be a traffic light for vehicles. Herein, the Go information may be a signal indicating straight, left turn, or right turn of the vehicle. The Stop information for the vehicles may be a signal indicating that the vehicle must stop. The Go information for the vehicles may be indicated in green and the Stop information for the vehicles may be indicated in red.

For example, the controller 170 may detect Go or Stop information for pedestrians from an object included in the acquired image. Herein, the object may be a traffic light for pedestrians. Herein, the Go information for the pedestrians may be a signal indicating that the pedestrians can cross the street at the crosswalk. Herein, the Stop information for the pedestrians may be a signal indicating that the pedestrians must stop at the crosswalk.

Meanwhile, the controller 170 may control zoom of the cameras 161 and 162. For example, the controller 170 may control zoom of the cameras 161 and 550 according to a result of object detection. For example, if a traffic signboard is detected, but the details marked on the traffic signboard are not detected, the controller 170 may control the cameras 161 and 162 to zoom in.

The controller 170 may receive weather information and traffic situation information (e.g., TPEG (Transport Protocol Experts Group)) through the communication unit 110.

The controller 170 may recognize, in real time or periodically, information about a traffic situation around the vehicle, which is identified based on stereo images.

The controller 170 may receive navigation information from the AVN apparatus or a separate navigation apparatus through the interface unit 180.

The controller 170 may receive sensor information from the controller 170 or the sensing unit 160 through the interface unit 180. Here, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and steering wheel rotation information.

The controller 170 may receive navigation information from the controller 170, the AVN apparatus, or a separate navigation apparatus through the interface unit 180.

Meanwhile, the controller 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electronic units for performing other functions.

The display unit 141 may display various kinds of information processed by the controller 170. The display unit 141 may display an image related to operation of the vehicle 1. To display such image, the display unit 141 may include a cluster or HUD on the inner front of the vehicle. If the display unit 141 is an HUD, the unit may include a projection module for projecting an image onto the windshield of the vehicle 1.

The power unit 190 may be controlled by the controller 170 to supply electric power necessary for operation of respective constituents. In particular, the power unit 190 may receive power from, for example, a battery in the vehicle 1.

FIG. 5 shows an internal block diagram of the controller 170 shown in FIG. 1.

Referring to FIG. 5, the controller 170 may include an image preprocessor 510, a disparity calculator 520, an object detector 534, an object tracking unit 540, and an application unit 550.

The image preprocessor 510 may receive images from the cameras 161 and 162 shown in FIG. 1, and perform preprocessing thereof.

Specifically, the image preprocessor 510 may perform noise reduction, rectification, calibration, color enhancement, color space conversion (CSC), interpolation and camera gain control of the images. Thereby, an image sharper than a stereo image captured by the cameras 161 and 162 may be acquired.

The disparity calculator 520 may receive images signal-processed by the image preprocessor 510, perform stereo matching upon the received images, and acquire a disparity map according to the stereo matching. That is, the disparity calculator 520 may acquire disparity information on a stereo image of the front view of the vehicle.

Here, the stereo matching may be performed in a pixel unit or a predetermined block unit of the stereo images. The disparity map may represent a map indicating numerical values representing binocular parallax information about the stereo images, namely left and right images.

The segmentation unit 532 may perform segmentation and clustering on at least one of the images based on the disparity information from the disparity calculator 520.

Specifically, the segmentation unit 532 may separate the background from the foreground in at least one of stereo images based on the disparity information.

For example, a region having disparity information less than or equal to a predetermined value in the disparity map may be calculated as the background and the corresponding part may be removed. Thereby, the foreground may be separated from the background.

As another example, a region having disparity information greater than or equal to a predetermined value in the disparity map may be calculated as the foreground and the corresponding part may be extracted. Thereby, the foreground may be separated from the background.

By separating the foreground from the background based on the disparity information extracted based on the stereo images, signal processing speed may be increased and signal-processing load may be reduced in the subsequent object detection operation.

Next, the object detector 534 may detect an object based on an image segment from the segmentation unit 532.

That is, the object detector 534 may detect an object in at least one of the images based on the disparity information.

Specifically, the object detector 534 may detect an object in at least one of the images. For example, the object detector may detect an object in the foreground separated through image segmentation.

Next, the object verification unit 536 may classify and verify the separated object.

To this end, the object verification unit 536 may use an identification technique employing a neural network, a support vector machine (SVM) technique, an identification technique based on AdaBoost using Haar-like features or the histograms of oriented gradients (HOG) technique.

Meanwhile, the object verification unit 536 may verify an object by comparing the detected object with objects stored in the memory 130.

For example, the object verification unit 536 may verify a nearby vehicle, a lane, a road surface, a signboard, a dangerous area, a tunnel, and the like which are positioned around the vehicle.

The object tracking unit 540 may track the verified object. For example, the object tracking unit 540 may sequentially perform verification of an object in the acquired stereo images, computation of the motion or motion vectors of the verified object, and tracking of movement of the object based on the computed motion or motion vector. Thereby, the object tracking unit 540 may track a nearby vehicle, a lane, a road surface, a signboard, a dangerous area, a tunnel, and the like which are positioned around the vehicle.

Next, the application unit 550 may calculate dangerousness to the vehicle 1 based on various objects positioned around the vehicle 1 (e.g., another vehicle, a lane, a road surface, a signboard, and the like). In addition, the application unit 550 may compute possibility of collision with a preceding vehicle, slippage of the vehicle, and the like.

In addition, the application unit 550 may output a message for delivering information such as the calculated dangerousness, collision possibility or slippage as driving assistance information. Alternatively, the application unit 550 may generate a control signal for controlling the position or movement of the vehicle 1 as vehicle control information.

According to an embodiment, the controller 170 may include only some of the image preprocessor 510, the disparity calculator 520, the segmentation unit 532, the object detector 534, the object verification unit 536, the object tracking unit 540 and the application unit 550.

For example, if the cameras 161 and 162 are configured to provide only two-dimensional images, the disparity calculator 520 may be omitted.

FIGS. 6A and 6B are views referred to in describing an operation of the controller 170 shown in FIG. 5.

FIGS. 6A and 6B are views referred to in describing an operation method of the controller 170 of FIG. 5 based on the stereo images acquired during first and second frame intervals, respectively.

First, referring to FIG. 6A, when the camera 161 is a stereo camera, the camera 161 acquires a stereo image during the first frame interval.

The disparity calculator 520 in the controller 170 receives stereo images FR1a and FR1b signal-processed by the image preprocessor 510 and performs stereo matching on the received stereo images FR1a and FR1b, thereby acquiring a disparity map 620.

The disparity map 620 is obtained by leveling the parallax between the stereo images FR1a and FR1b. At a higher disparity level, a shorter distance to the vehicle may be calculated. At a lower disparity level, a longer distance to the vehicle may be calculated.

When the disparity map is displayed, higher brightness may be provided to a higher disparity level and lower brightness may be provided to a lower disparity level.

In the example illustrated in the figure, first to fourth lane lines 628a, 628b, 628c and 628d have corresponding disparity levels, and a construction area 622, a first preceding vehicle 624 and a second preceding vehicle 626 have corresponding disparity levels in the disparity map 620, respectively.

The segmentation unit 532, the object detector 534, and the object verification unit 536 perform segmentation, object detection and object verification in at least one of the stereo images FR1a and FR1b based on the disparity map 620.

In the example illustrated in the figure, object detection and verification are performed in the second stereo image FR1b using the disparity map 620.

That is, in the image 630, object detection and verification may be performed for the first to fourth lane lines 638a, 638b, 638c and 638d, a construction area 632, a first preceding vehicle 634, and a second preceding vehicle 636.

Next, referring to FIG. 6B, the stereo camera 161 acquires a stereo image during the second frame interval.

The disparity calculator 620 in the controller 170 receives stereo images FR2a and FR2b signal-processed by the image preprocessor 510, and performs stereo matching on the received stereo images FR2a and FR2b, thereby acquiring a disparity map 640.

In the exemplary figure, first to fourth lines 648a, 648b, 648c and 648d have corresponding disparity levels, and a construction area 642, a first preceding vehicle 644 and a second preceding vehicle 646 have corresponding disparity levels in the disparity map 640.

The segmentation unit 532, the object detector 534, and the object verification unit 536 perform segmentation, object detection and object verification in at least one of the stereo images FR2a and FR2b based on the disparity map 640.

In the exemplary figure, object detection and verification are performed in the second stereo image FR2b using the disparity map 640.

That is, object detection and verification may be performed for the first to fourth lane lines 658a, 658b, 658c and 658d, a construction area 652, a first preceding vehicle 654, and a second preceding vehicle 656 in the image 650.

The object tracking unit 540 may track a verified object by comparing FIGS. 6A and 6B.

Specifically, the object tracking unit 540 may track movement of an object based on motions or motion vectors of the individual objects verified in FIGS. 6A and 6B. Thereby, the lane lines, the construction area, the first preceding vehicle, the second preceding vehicle and the like positioned around the vehicle may be tracked.

The vehicle 1 according to embodiments of the present invention to be described below may travel in either the manual driving mode or the autonomous driving mode. In the autonomous driving mode, the vehicle 1 may travel alone or may join a group and follow the leader vehicle of the group. The group may travel on a road including a plurality of lanes. As an example, all the vehicles included in the group may be traveling in a line within a single lane included in the road. As another example, some of the vehicles included in the group may be traveling in one of the lanes included in the road, and the other vehicles may be traveling in another lane included in the road. All the vehicles in the group, including the leader vehicle, may share their traveling information with other vehicles in the group. In addition, all the vehicles in the group except the leader vehicle may travel on the road without intervention of the drivers while securing a longitudinal safe distance and a lateral safe distance between each other based on the shared traveling information and the external environment information.

Also, any one of the vehicles having joined the group may withdraw from the group, and a new vehicle may join the group. In the case where a vehicle that has joined the group withdraws from the group or a new vehicle joins the group, that is, the size of the group (i.e., the number of vehicles included in the group) changes, the speed or position of the group may be changed by the leader vehicle.

FIG. 7 is a flowchart illustrating an exemplary control method S700 according to an embodiment of the present invention.

The vehicle illustrated in FIG. 7 may be the vehicle 1 described with reference to FIG. 1. Further, the control method S700 according to FIG. 7 may include a plurality of steps, and each of the steps may be performed by at least one of the elements shown in FIG. 1. In addition, the vehicle described in FIG. 7 may have joined a group. The group includes at least a leader vehicle and the aforementioned vehicle.

In step S710, the controller 170 receives the traveling information and external environment information about the vehicles having joined the group. Here, the traveling information about the vehicles may include at least one of the current position, the current speed, the current lane, or the current direction of the vehicles. The traveling information about the vehicles may be acquired by at least one sensor included in the sensing unit illustrated in FIG. 1, and then provided to the controller 170.

Further, the external environment information about a vehicle includes information about at least one obstacle present around the vehicle (for example, within 10 m from the vehicle). The obstacle may be another vehicle, which may or may not have joined the group. If the obstacle is another vehicle, the external environment information may include traveling information about the other vehicle. The traveling information about the other vehicle may include at least one of the current position, the current speed, the current lane, and the current direction of the other vehicle. The external environment information may be acquired by at least one sensor included in the sensing unit illustrated in FIG. 1, and then provided to the controller 170.

In step S720, the controller 170 receives the traveling information about the group. The traveling information about the group includes traveling information about the leader vehicle of the group. The traveling information about the group may further include traveling information about at least one other vehicle having joined the group (hereinafter referred to as a follower vehicle). The traveling information about the leader vehicle includes at least one of the current position, the current speed, the current lane, and the current direction of the leader vehicle. The traveling information about the leader vehicle may further include a path of the leader vehicle. Here, the path of the leader vehicle may be a path pre-searched with respect to the destination of the leader vehicle. The traveling information about the follower vehicle includes at least one of the current position, the current speed, the current lane, and the current direction of the follower vehicle.

The traveling information about the group may be transmitted from the leader vehicle or the follower vehicle having joined the group to the other vehicle through inter-vehicle communication. For example, the communication unit may receive the traveling information about the group from the leader vehicle of the group, and then provide the same to the controller 170.

Steps S710 and S720 may be performed in parallel as shown in FIG. 7, or may be performed in series.

In step S730, the controller 170 determines the target position of the vehicle with respect to the group based on at least one of the traveling information about the vehicles, the external environment information, and the traveling information about the group. Here, the target position of the vehicle may be in a region of any one of a plurality of lanes included in the road. Alternatively, the target position of the vehicle may be a point within a predetermined distance from the leader vehicle of the group. Step S730 will be described later with reference to FIGS. 8 to 11.

In step S740, the controller 170 may control the vehicle to execute at least one operation corresponding to the target position. For example, when the current position and the target position of the vehicle are the same, the controller 170 may control the vehicle to maintain the current speed and the current direction. As another example, when the current position and the target position of the vehicle are different from each other, the controller 170 may control the vehicle to execute at least one of acceleration, deceleration, direction change, and lane change such that the vehicle moves from the current position to the target position.

FIG. 8 is a flowchart illustrating an exemplary control method S800 related to step S730 shown in FIG. 7.

In step S810, the controller 170 determines the current position and the current lane of the vehicle based on the traveling information about the vehicle received in step S710.

In step S820, the controller 170 determines the current position and the current lane of the leader vehicle based on the traveling information about the group received in step S720.

In step S830, the controller 170 determines the longitudinal distance between the vehicle and the leader vehicle. For example, the controller 170 may determine the longitudinal distance between the vehicle and the leader vehicle based on the difference between the current longitudinal position of the vehicle and the current longitudinal position of the leader vehicle.

In step S840, the controller 170 determines whether the longitudinal distance between the vehicle and the leader vehicle is greater than or equal to a threshold value. The threshold value may be a value pre-stored in the memory.

If it is determined that the longitudinal distance between the vehicle and the leader vehicle is greater than or equal to the threshold value, the controller 170 executes step S850. On the other hand, if it is determined that the longitudinal distance between the vehicle and the leader vehicle is less than the threshold value, the controller 170 may terminate execution of the control method S800.

In step S850, the controller 170 determines whether the current lane of the vehicle is the same as the current lane of the leader vehicle. For example, the controller 170 may determine whether the vehicle and the leader vehicle are traveling in the same lane based on the difference between the current lateral position of the vehicle and the current lateral position of the leader vehicle.

If it is determined that the current lane of the vehicle is the same as the current lane of the leader vehicle, the controller 170 executes step S860. On the other hand, if it is determined that the vehicle is traveling in a lane different from the lane of the leader vehicle, the controller 170 may terminate execution of the control method S800.

In step S860, the controller 170 determines the target position of the vehicle with respect to the group within the area of a lane different from the current lane of the vehicle. For example, the controller 170 may select a lane other than the current lane of the vehicle among a plurality of lanes included in the road, and determine one point in the area of the selected lane as the target position FIG. 9 is a flowchart illustrating another exemplary control method S900 related to step S730 shown in FIG. 7.

In step S910, the controller 170 determines the current lane of the vehicle based on the traveling information about the vehicle received in step S710.

In step S920, the controller 170 determines the current lane of the leader vehicle based on the traveling information about the group received in step S720.

In step S930, the controller 170 detects another vehicle ahead of the vehicle based on the external environment information received in step S710. The other vehicle in step S930 may be a vehicle that has not joined the group.

In step S940, the controller 170 determines whether the current lane of the vehicle is the same as the current lane of the leader vehicle. That is, the controller 170 may determine whether the vehicle and the leader vehicle are traveling in the same lane.

If it is determined that the current lane of the vehicle is the same as the current vehicle of the leader vehicle, the controller 170 executes step S950. On the other hand, if it is determined that the vehicle is traveling in a lane different from the lane of the leader vehicle, the controller 170 may terminate execution of the control method S900.

In step S950, the controller 170 determines whether another vehicle is located between the vehicle and the leader vehicle. That is, the controller 170 may determine whether the position of the other vehicle detected in step S930 is in front of the vehicle and behind the leader vehicle. As an example, the other vehicle detected in step S930 may be a vehicle that suddenly interrupts the front of the vehicle. Alternatively, the other vehicle detected in step S930 may be a follower vehicle having joined the group.

If it is determined that the other vehicle is located between the vehicle and the leader vehicle, the controller 170 executes step S960. On the other hand, if it is determined that the other vehicle is not located between the vehicle and the leader vehicle, the controller 170 may terminate execution of the control method (S900).

In step S960, the controller 170 determines the target position of the vehicle with respect to the group within the area of a lane different from the current lane of the vehicle. For example, the controller 170 may select a lane other than the current lane of the vehicle among a plurality of lanes included in the road, and determine one point in the area of the selected lane as the target position.

FIG. 10 is a flowchart illustrating another exemplary control method S1000 related to step S730 shown in FIG. 7.

In step S1010, the controller 170 determines the current lane of the vehicle based on the traveling information about the vehicle received in step S710.

In step S1020, the controller 170 determines the current lane of the leader vehicle based on the traveling information about the group received in step S720.

In step S1030, the controller 170 determines whether the current lane of the vehicle is the same as the current lane of the leader vehicle. That is, the controller 170 may determine whether the vehicle and the leader vehicle are traveling in the same lane.

If it is determined that the current lane of the vehicle is the same as the current vehicle of the leader vehicle, the controller 170 executes step S1040. On the other hand, if it is determined that the vehicle is traveling in a lane different from the lane of the leader vehicle, the controller 170 may terminate execution of the control method S1000.

In step S1040, the controller 170 detects an empty lane among a plurality of lanes included in the road based on the external environment information. The empty lane may refer to a lane without any obstacle (e.g., another vehicle) located within a predetermined distance from the vehicle.

In step S1050, the controller 170 determines the target position of the vehicle with respect to the group within the area of the empty lane detected in step S1040. For example, the controller 170 may determine, as the target position of the vehicle, one point in an area within a predetermined distance (e.g., 10 m) from the leader vehicle in the entire area of the empty lane.

FIG. 11 is a flowchart illustrating another exemplary control method S1100 related to step S730 shown in FIG. 7. It is assumed that a plurality of follower vehicles is included in a group illustrated in FIG. 11.

In step S1110, the controller 170 determines the current position and the current lane of the vehicle based on the traveling information about the vehicle received through step S710.

In step S1120, the controller 170 determines the current position and the current lane of the leader vehicle based on the traveling information about the group received in step S720.

In step S1130, the controller 170 determines the current position and the current lane of each of the plurality of follower vehicles based on the traveling information about the group received in step S720. All of the plurality of follower vehicles may be traveling ahead of the vehicle. For example, in the case where a first follower vehicle and a second follower vehicle have joined the group, the controller 170 may determine the current position and the current lane of the first follower vehicle based on the traveling information about the first follower vehicle, and determine the current position and the current lane of the second follower vehicle based on the traveling information about the second follower vehicle. Here, the current lane of the first follower vehicle may be the same as or different from the current lane of the second follower vehicle.

In step S1140, the controller 170 selects one of the plurality of follower vehicles. Specifically, the controller 170 may select one of the plurality of follower vehicles according to a predetermined rule. Here, the rule may be related to at least one of speed, distance, fuel efficiency, lane, and path. For example, the controller 170 may select one follower vehicle having a speed closest to the speed of the leader vehicle among the plurality of follower vehicles. As another example, the controller 170 may select a follower vehicle having the shortest longitudinal distance from the leader vehicle among the plurality of follower vehicles. As another example, the controller 170 may select a follower vehicle having the best fuel efficiency among the plurality of follower vehicles. As another example, the controller 170 may select a follower vehicle following a path most similar to that of the vehicle among the plurality of follower vehicles. For example, the controller 170 may receive the destination and waypoints of each of the plurality of follower vehicles through inter-vehicle communication, compare the same with the destination and waypoints of the vehicle, and select a follower vehicle having the longest common path. The above-mentioned rule may be stored in the memory and may be changed according to a command from the driver of the vehicle.

Alternatively, the controller 170 may select one of the plurality of follower vehicles according to a command (e.g., a voice, a touch, a gesture) of the driver of the vehicle. For example, the controller 170 may display indicators indicating the plurality of followers on a touchscreen inside the vehicle, and may select, when the driver of the vehicle touches an indicator, a follower vehicle corresponding to the touched indicator.

In step S1150, the controller 170 determines the target position of the vehicle with respect to the group, within the area of the lane of the follower vehicle selected in step S1140. For example, the target position of the vehicle determined by the controller 170 may be at a predetermined distance behind the selected follower vehicle.

FIG. 12A is a view referred to in describing an operation of a vehicle according to an embodiment of the present invention.

FIG. 12A shows a top view 1200 of a group 1210 traveling on a road including four lanes 1201, 1202, 1203, and 1204. The vehicle 1 has joined the group 1210. All the vehicles 1211, 1212, 1213, 1214 and 1 in the group 1210 are traveling in the +y direction in the same lane 1201 on a road, while sharing the traveling information thereabout with each other through inter-vehicle communication. Another vehicle 1215 that has not joined the group 1210 is traveling in the +y direction on a lane 1201 different from that of the group 1210. The leader vehicle 1211 is positioned at the front of the group 1210 and the vehicle is positioned at the back of the group 1210. Three follower vehicles 1212, 1213 and 1214 are positioned between the leader vehicle 1211 and the vehicle.

The vehicle 1 may check the traveling state of each of the leader vehicle 1211 and the follower vehicles 1212, 1213 and 1214 in the group 1210 in the autonomous driving mode. The traveling state may mean the current position, the current speed, the current lane, and the distance between the vehicles. For example, the controller 170 may calculate the distance G1 between the leader vehicle 1211 and the follower vehicle 1212, the distance G2 between the follower vehicle 1212 and the follower vehicle 1213, the distance G3 between the follower vehicle 1213 and the follower vehicle 1214, and the distance G4 between the follower vehicle 1214 and the vehicle 1 based on the traveling information about the vehicle 1 and the traveling information about the group 1210. Here, the inter-vehicle distances G1, G2, G3, and G4 may be set to be longer than or equal to a predetermined safe distance in order to prevent collision between the vehicles during group travel.

The controller 170 may calculate the longitudinal distance L1 between the vehicle 1 and the leader vehicle 1211 based on the traveling information about the vehicle 1 and the traveling information about the leader vehicle 1211. The controller 170 may also determine whether the longitudinal distance L1 between the vehicle and the leader vehicle is greater than or equal to a threshold value T1. In FIG. 12A, the threshold value T1 may be a distance (e.g., 100 m) set in order to prevent a situation where the vehicle 1 and the leader vehicle 1211 are too far apart from each other in the group 1210. For example, if the vehicle 1 is positioned too far from the leader vehicle 1211, it becomes difficult for the vehicle 1 to follow the leader vehicle 1211. Accordingly, the threshold value T1 may be set to ensure that the vehicle 1 and the leader vehicle 1211 travel together within an appropriate range.

FIG. 12B is a view referred to in describing an operation of the vehicle associated with the situation shown in FIG. 12A.

FIG. 12B shows a top view 1230 illustrating a target position determined by the controller 170 of the vehicle 1 when the longitudinal distance L1 between the vehicle 1 and the leader vehicle 1211 exceeds the threshold value T1 as shown in FIG. 12A.

The controller 170 may detect an empty lane in an image. For example, the controller 170 may detect empty lanes 1203 and 1204 in an image provided from the camera 161 of the vehicle 1.

In another example, the controller 170 may determine whether the left lane 1201 or the right lane 1203 with respect to the current lane 1202 of the vehicle 1 is empty, that is, whether there is no other vehicle, based on a sensing signal provided from at least one sensor (for example, the radar and the lidar) included in the sensing unit 160.

If two or more empty lanes are detected, the controller 170 may select a lane closer to the leader vehicle 1211 between the two or more empty lanes. For example, since another vehicle 1215 is traveling in a lane 1215, the controller 170 may determine that the two lanes 1203 and 1204 on the right side of the current lane 1202 are empty lanes, and select the lane 1203 closer to the leader vehicle 1203 than the lane 1204.

The controller 170 may determine a target position within the area of the selected lane 1203. Referring to FIG. 12B, one point 1240 in an area corresponding to a range from the leader vehicle 1211 to the threshold value T1 in the entire area of the selected lane 1203 may be determined as a target position of the vehicle 1.

FIG. 12C is a view referred to in describing an operation of the vehicle associated with the situation shown in FIG. 12B.

FIG. 12C shows a top view 1250 illustrating an operation corresponding to the target position 1240 shown in FIG. 12B.

The controller 170 may generate at least one operation required to move from the current position of the vehicle 1 to the target position 1240 when determination of the target position is completed. For example, the at least one operation required to move from the current position of the vehicle 1 to the target position 1240 may include at least one of acceleration, deceleration, direction change, and lane change.

Referring to FIGS. 12B and 12C, the current position of the vehicle 1 is within the lane 1202 and the target position 1240 is within the lane 1203. Therefore, the at least one operation required to move from the current position of the vehicle 1 to the target position 1240 includes lane change from the lane 1202 to the lane 1203. The at least one operation may also include an acceleration operation up to the target position 1240 ahead after the vehicle 1 moves into the lane 1203.

According to FIGS. 12A and 12B, when the distance between the vehicle 1 and the leader vehicle 1211 becomes excessively long, the vehicle 1 may continue to follow the leader vehicle 1211 on a lane different from the current lane of the leader vehicle 1211 to. In this case, since the vehicle 1 and the leader vehicle 1211 in the group 1210 are located in different lanes, a safe distance between the vehicles may not need to be secured, and the total length of the group 1210 may be reduced.

Further, when one or more follower vehicles 1212, 1213, 1214 are located between the vehicle 1 and the leader vehicle 1211, the vehicle 1 may keep following the leader vehicle 1211 in a lane different from the lane of the follower vehicles 1212, 1213 and 1214. As a result, the possibility that the vehicle 1 misses the leader vehicle 1211 in the group 1210 may be reduced and the efficiency of use of the road may be enhanced.

FIG. 13A is a view referred to in describing an operation of a vehicle according to an embodiment of the present invention.

FIG. 13A shows a top view 1300 of a group 1310 traveling on a road including three lanes 1301, 1302, and 1303. The vehicle 1 has joined the group 1310. For simplicity, it is assumed that there is no follower vehicle having joined the group 1310. The vehicle 1 and the leader vehicle 1311 may share the traveling information thereabout with each other periodically or in real time through inter-vehicle communication.

The leader vehicle 1311 of the group 1310 and the vehicle 1 are traveling in a line in the +y direction within the same lane 1302 of the road. In this situation, another vehicle 1321 traveling in a lane 1303 different from the lane of the group 1310 while not joining the group 1310 may move into a space between the leader vehicle 1311 and the vehicle 1 through lane change.

The controller 170 may detect the other vehicle 1321 in front of the vehicle 1 in the same lane as the vehicle 1, based on an image or a sensing signal provided from the sensing unit. That is, the controller 170 may determine whether another vehicle that has not joined the group 1310 is positioned between the leader vehicle 1311 and the vehicle 1.

FIG. 13B is a view referred to in describing an operation of the vehicle associated with the situation shown in FIG. 13A.

FIG. 13B shows a top view 1330 illustrating a target position 1340 determined by the controller 170 of the vehicle 1 when another vehicle 1321 is positioned between the vehicle 1 and the leader vehicle 1311 as shown in FIG. 13A.

The controller 170 may detect an empty lane in an image. For example, the controller 170 may detect empty lanes 1301 and 1303 in an image provided from the camera 161 of the vehicle 1.

In another example, the controller 170 may determine whether the left lane 1301 or the right lane 1303 with respect to the current lane 1302 of the vehicle 1 is empty, that is, whether there is no other vehicle, based on a sensing signal provided from at least one sensor (for example, the radar and the lidar) included in the sensing unit 160.

If two or more empty lanes are detected, the controller 170 may select only one of the two or more empty lanes based on the position of the driver's seat in the vehicle 1. For example, when the driver's seat of the vehicle 1 is on the left side, the controller 170 may select the leftmost lane 1301 between the two or more empty lanes 1301 and 1303.

The controller 170 may determine a target position within the area of the selected lane 1301. Referring to FIG. 13B, one point 1340 within a predetermined distance from the leader vehicle 1311 in the entire area of the selected lane 1301 may be determined as the target position of the vehicle 1.

The controller 170 may generate at least one operation required to move from the current position of the vehicle 1 to the target position 1340 when determination of the target position 1340 is completed. For example, the at least one operation required to move from the current position of the vehicle 1 to the target position 1340 may include at least one of acceleration, deceleration, direction change, and lane change.

Referring to FIGS. 13A and 13B, the current position of the vehicle 1 is within the lane 1302 and the target position 1340 is within the lane 1301. Therefore, the at least one operation required to move from the current position of the vehicle 1 to the target position 1340 includes lane change from the lane 1302 to the lane 1301. The at least one operation may also include an acceleration operation up to the target position 1340 ahead after the vehicle 1 moves into the lane 1303.

FIG. 13C is a view referred to in describing an operation of the vehicle associated with the situation shown in FIG. 13A.

FIG. 13C shows a top view 1350 illustrating a target position 1360 determined by the controller 170 of the vehicle 1 when another vehicle 1321 is positioned between the vehicle 1 and the leader vehicle 1311 as shown in FIG. 13A.

In contrast with FIG. 13B, the controller 170 may determine the target position within the area of the current lane 1302 of the vehicle 1 in the example of FIG. 13C. Specifically, the controller 170 may calculate the distance d between the leader vehicle 1311 and the other vehicle 1321, and determine whether the distance d is greater than or equal to a threshold value T2. As shown in the figure, if the distance d is greater than or equal to the threshold value T2, the controller 170 may determine one point 1360 between the leader vehicle 1311 and the other vehicle 1321 as the target position of the vehicle 1.

The controller 170 may generate at least one operation required to move from the current position of the vehicle 1 to the target position 1360 when determination of the target position 1360 is completed. For example, the at least one operation required to move from the current position of the vehicle 1 to the target position 1340 may include at least one of acceleration, deceleration, direction change, and lane change.

Referring to FIGS. 13A and 13B, both the current position and the target position 1360 of the vehicle 1 are within the lane 1302 and the target position 1360 is between the leader vehicle 1311 and the other vehicle 1321. Therefore, the at least one operation required to move from the current position of the vehicle 1 to the target position 1360 includes an operation of passing the other vehicle 1321. Specifically, the operation of passing the other vehicle 1321 includes performing lane change twice in series. That is, after changing from the lane 1302 to the lane 1301 is performed, a change from the lane 1301 to the lane 1302 is required. The operation for passing the other vehicle 1321 may also include decelerating or accelerating the vehicle 1 according to the speed of the leader vehicle 1311.

According to FIGS. 13A to 13C, when the other vehicle 1321 irrelevant to the group 1310 is positioned between the vehicle 1 and the leader vehicle 1311, the vehicle 1 may keep following the leader vehicle 1311 through lane change without being disturbed by the other vehicle 1321.

When the other vehicle 1321 irrelevant to the group 1310 is positioned between the vehicle 1 and the leader vehicle 1311, the controller 170 may transmit an alarm notification to the other vehicle 1321 through inter-vehicle communication. The driver of the other vehicle 1321 may move the other vehicle 1321 to another lane in accordance with the alarm notification.

FIG. 14A is a view referred to in describing an operation of a vehicle according to an embodiment of the present invention.

FIG. 14A shows a top view 1400 of a group 1410 traveling on a road including three lanes 1401, 1402, and 1403. It is assumed that a leader vehicle 1411 and two follower vehicles 1412 and 1413 are included in the group 1410. The leader vehicle 1411 and the follower vehicle 1413 are traveling in the middle lane 1402, the follower vehicle 1413 is traveling in the right lane 1403, and the vehicle 1 is traveling in the left lane 1401.

All the vehicles 1411, 1412 and 1413 of the group 1410 may share the traveling information thereabout with each other periodically or in real time through inter-vehicle communication.

It is assumed that the controller 170 of the vehicle 1 has transmitted a request to join the group 1410 to the leader vehicle 1411 through inter-vehicle communication, and the leader vehicle 1411 has approved the request to join the group 1410.

The controller 170 may determine the target position of the vehicle 1 with respect to the group 1410 according to a predefined rule. In addition, the controller 170 may update the target position of the vehicle 1 in the group 1410 in real time or periodically. Here, the rule applied to determine the target position of the vehicle 1 with respect to the group 1410 may be related to speed, distance, fuel efficiency, lane, path, and the like, as described above.

Alternatively, the controller 170 may determine the target position of the vehicle 1 with respect to the group 1410 according to a command from the driver of the vehicle 1.

FIG. 14B is a view referred to in describing an operation of the vehicle associated with the situation shown in FIG. 14A.

FIG. 14B shows a top view 1420 illustrating a case where a first rule defined to determine a target position within the area of the same lane 1402 as the lane of the leader vehicle 1411 is applied.

The controller 170 may check the current position and the current lane of each of the leader vehicle 1411, the follower vehicle 1412, the follower vehicle 1413, and the vehicle 1. The controller 170 may determine that the leader vehicle 1411 and the follower vehicle 1413 are traveling in the lane 1402 on the right side of the current lane 1401 of the vehicle 1.

The controller 170 may also determine one point 1430 in the area of the current lane 1402 of the leader vehicle 1411 as the target position, according to the first rule. As an example, the target position 1430 may be on the back of the follower vehicle 1413.

Subsequently, the controller 170 may determine at least one operation corresponding to the target position 1430. The at least one operation corresponding to the target position 1430 includes lane change from the current lane 1401 of the vehicle 1 to the lane 1402 to which the target position 1430 belongs.

FIG. 14C is a view referred to in describing an operation of the vehicle associated with the situation shown in FIG. 14A.

FIG. 14C shows a top view 1440 illustrating a case where a second rule defined to determine a target position within the lane of a follower vehicle closest to the leader vehicle 1411 between the follower vehicles 1412 and 1413 of the group 1410 is applied.

The controller 170 may check the current position and the current lane of each of the leader vehicle 1411, the follower vehicle 1412, the follower vehicle 1413, and the vehicle 1. Thereby, the controller 170 may determine that the follower vehicle 1412 is closest to the leader vehicle 1411 between the follower vehicles 1412 and 1413 of the group 1410.

The controller 170 may also determine one point 1450 within the area of the current lane 1403 of the follower vehicle 1412 as the target position, in accordance with the second rule. As an example, the target position 1450 may be on the back of the follower vehicle 1412 as shown in the figure.

Subsequently, the controller 170 may determine at least one operation corresponding to the target position 1450. The at least one operation corresponding to the target position 1450 includes two lane changes from the current lane 1401 of the vehicle 1 to the lane 1403 to which the target position 1450 belongs. For example, the at least one operation may include performing first lane change from the current lane 1401 to the middle lane 1402 of the vehicle 1 and then second lane change from the middle lane 1402 to the lane 1403 on the right side. The controller 170 may also control the vehicle 1 to accelerate until the vehicle 1 reaches the target position 1450 after entering the lane 1403 on the right side.

FIG. 14D is a view referred to in describing an operation of the vehicle associated with the situation shown in FIG. 14A.

FIG. 14D shows a top view 1460 illustrating a case where a third rule defined to determine a target position with respect to the group 1410 within the current lane of the vehicle 1.

The controller 170 may check the current position and the current lane of each of the leader vehicle 1411, the follower vehicle 1412, the follower vehicle 1413, and the vehicle 1. Thereby, the controller 170 may determine one point within a predetermined distance from the leader vehicle 1411 in the entire area of the current lane 1401 of the vehicle 1 as a target position 1470.

Subsequently, the controller 170 may determine at least one operation corresponding to the target position 1470. When the third rule is applied, the at least one operation includes a lane keeping operation, but does not include lane change. In addition, the controller 170 may control the vehicle 1 to continuously accelerate from the current time until the vehicle 1 reaches the target position 1470.

According to FIG. 14D, the vehicle 1 can keep following the leader vehicle 1411 in the group 1410 while maintaining the current lane 1401. Accordingly, a risk associated with lane change (for example, collision with another vehicle) may be lowered.

FIG. 14E is a view referred to in describing an operation of the vehicle associated with the situation shown in FIG. 14A.

FIG. 14E illustrates a guide screen 1480 provided to the driver of the vehicle 1 in the situation 1400 shown in FIG. 14A. For example, the guide screen 1480 may be displayed on one of the displays included in the display unit.

The guide screen 1480 may include an indicator 1481 indicating the leader vehicle 1411 of the group 1410, an indicator 1482 indicating the follower vehicle 1412, an indicator 1483 indicating the follower vehicle 1413, and an indicator 1484 indicating the vehicle 1. As shown in the figure, the indicator 1481 indicating the leader vehicle 1411 may be displayed differently in color, shape, size, thickness, etc. from the indicators 1482 and 1483 indicating the follower vehicles 1412 and 1413.

The guide screen 1480 may also include an indicator 1491 indicating the target position 1430 corresponding to the first rule, an indicator 1492 indicating the target position 1450 corresponding to the second rule, and an indicator 1493 indicating the target position 1470 corresponding to the third rule.

When the guide screen 1480 is displayed on the touchscreen, the driver may select one of the indicators 1491, 1492, and 1493 indicating the target positions 1430, 1450, and 1470 through the touch operation. The controller 170 may determine the target position indicated by one of the indicators 1491, 1492, and 1493 selected by the driver as the target position of the vehicle. For example, when the driver selects the indicator 1491, the controller 170 may control the vehicle 1 to change lanes from the current lane 1401 to another lane 1402.

FIG. 15 is a flowchart illustrating an exemplary control method S1500 according to an embodiment of the present invention.

The vehicle illustrated in FIG. 15 may be the vehicle 1 described with reference to FIG. 1. In addition, the control method S1500 according to FIG. 15 may be performed in parallel with at least one of the plurality of steps included in the control method S700 shown in FIG. 7.

Further, the control method S1500 according to FIG. 15 may include a plurality of steps, and each of the steps may be performed by at least one of the elements shown in FIG. 1. Further, the vehicle described in FIG. 15 may have joined a group. The group includes at least a leader vehicle and the vehicle. The group may be traveling on a road including a plurality of lanes. For example, all the vehicles included in the group may be traveling in any one of the lanes included in the road. As another example, some of the vehicles included in the group may be traveling in one of the lanes included in the road, and the other vehicles may be traveling in another lane included in the road.

In step S1510, the controller 170 determines a withdrawal position of the vehicle with respect to the group based on at least one of the traveling information about the vehicle, the external environment information, and the traveling information about the group. For example, if a situation where the vehicle cannot follow the leader vehicle of the group any longer occurs during execution of any one of the steps described above with reference to FIGS. 7 to 11, step S1510 may be performed. Examples of the situation where the vehicle cannot follow the leader vehicle of the group any longer may include lack of fuel, vehicle failure, and search of a path that is different from the path of the group.

Step S1510 will be described in detail with reference to FIGS. 16 to 18.

In step S1520, the controller 170 may control the vehicle to execute at least one operation corresponding to the withdrawal position of the vehicle. For example, the controller 170 may provide a notification to guide the withdrawal position. In this case, the notification may be provided before the vehicle reaches the withdrawal position (e.g., 1 km behind the withdrawal position). In addition, the notification may include a message indicating at least one action (e.g., holding the steering wheel, gazing forward, checking the path) that the driver of the vehicle should take before reaching the withdrawal position. As another example, the controller 170 may transmit a withdrawal request to the leader vehicle of the group before the vehicle reaches the withdrawal position. The withdrawal request may be transmitted to the leader vehicle of the group only when all of the at least one action to be taken before the driver of the vehicle reaches the withdrawal position is completed. As another example, when the vehicle reaches the withdrawal position, the controller 170 may switch the vehicle from the autonomous driving mode to the manual driving mode. As another example, the controller 170 may search for another group present around the withdrawal position.

FIG. 16 is a flowchart illustrating an exemplary control method S1600 related to step S1510 shown in FIG. 15.

In step S1610, the controller 170 calculates the travelable distance based on the fuel efficiency and fuel amount of the vehicle. At this time, the travelable distance may be calculated further based on at least one of the current speed of the vehicle, an average speed for a predetermined time, and the condition of the road (e.g., the slope).

In step S1620, the controller 170 may determine whether the travelable distance is shorter than the length of the remaining portion of the searched path of the leader vehicle. For example, when the destination of the leader vehicle of the group is the same as the destination of the vehicle, the controller 170 may calculate the remaining distance from the current position of the vehicle to the destination, and compare the calculated remaining distance with the travelable distance calculated in step S1610 to determine whether or not the current amount of fuel is smaller than the fuel amount needed to reach the destination. If the travelable distance is shorter than the path length of the remaining portion of the searched path of the group, the controller 170 may perform step S1630.

In step S1630, the controller 170 may determine the withdrawal position of the vehicle with respect to the group based on the travelable distance. For example, the controller 170 may determine a position that is at 8/10 of the travelable distance ahead from the current position of the vehicle as the withdrawal position of the vehicle. As another example, the controller 170 may receive, from the communication unit, the position of a gas station present within the travelable distance and determine one point around the gas station as the withdrawal position of the vehicle.

FIG. 17 is a flowchart illustrating another exemplary control method S1700 related to step S1510 shown in FIG. 15.

In step S1710, the controller 170 may identify a route common to the searched path of the leader vehicle and the searched path of the vehicle. Specifically, the controller 170 may receive the searched path of the leader vehicle through inter-vehicle communication. In addition, the controller 170 may receive the searched path of the vehicle from the navigation system provided in the vehicle. For example, if the searched path of the leader vehicle runs along "the current position→position A→position B→position C", and the searched path of the vehicle runs along "current position→position A→position B→position D", the route along "the current position→position A→position B" may be identified as the common route.

In step S1720, the controller 170 determines a withdrawal position of the vehicle with respect to the group based on the common route. In the example described above in relation to step S1710, the controller 170 may determine position B, which is the end position of the common route, as the withdrawal position of the vehicle with respect to the group.

FIG. 18A is a view referred to in describing an operation of a vehicle according to an embodiment of the present invention.

FIG. 18A shows a top view 1800 of a group 1810 traveling on a road including three lanes 1801, 1802 and 1803. The vehicle 1 has joined the group 1810. The vehicles in the group 1810 are all traveling in a line in the +y direction within the same lane 1802. A leader vehicle 1811 is positioned at the front of the group 1810, the vehicle 1 is positioned at the back of the group 1810, and a follower vehicle 1812 is positioned between the leader vehicle 1811 and the vehicle 1.

The controller 170 calculates the travelable distance L2 based on the speed (e.g., instantaneous speed, average speed) of the vehicle 1, the fuel efficiency and the remaining fuel amount, and searches for a gas station 1820 within the travelable distance L2. The gas station 1820 is close to the right lane 1803.

In this case, the controller 170 may determine a withdrawal position 1830 of the vehicle 1 between the current position of the vehicle 1 and the position of the gas station 1820. For example, the withdrawal position 1830 may be at a predetermined distance T3 from the position of the gas station 1820 in the −y direction. The controller 170 may transmit a withdrawal request including the withdrawal position 1830 to the leader vehicle 1811.

FIG. 18B is a view referred to in describing an operation of the vehicle associated with the situation shown in FIG. 18A.

FIG. 18B illustrates a guide screen 1850 provided to the driver of the vehicle 1 in the situation 1800 shown in FIG. 18A. For example, the guide screen 1850 may be displayed on one of the displays included in the display unit.

The guide screen 1850 provides a notification to guide the withdrawal position 1820 before the vehicle 1 reaches the withdrawal position 1820.

Specifically, the guide screen 1850 may include an indicator 1851 indicating the leader vehicle 1811, an indicator 1852 indicating the follower vehicle 1812, and an indicator 1853 indicating the vehicle 1. As shown in the figure, the indicator 1851 indicating the leader vehicle 1811 may be displayed differently in color, shape, size, thickness, and the like from the indicator 1852 indicating the follower vehicle 1812. The guide screen 1850 may also include an indicator 1860 indicating the gas station 1820 and an indicator 1870 indicating the target position 1830.

Before or after the guide screen 1850 is provided, the controller 170 may control the vehicle 1 to make a lane change from the current lane 1802 to the lane 1803 to which the withdrawal position 1830 belongs. When the vehicle 1 reaches the withdrawal position 1830 after lane change, the vehicle 1 withdraws from the group 1810. That is, inter-vehicle communication with the leader vehicle 1811 is released. Immediately after the vehicle withdraws from the group 1810, the controller 170 may switch the vehicle 1 from the autonomous driving mode to the manual driving mode.

FIG. 19A is a view referred to in describing an operation of a vehicle according to an embodiment of the present invention.

FIG. 19A shows a top view 1900 of a group 1910 traveling on a road including three lanes 1901, 1902 and 1903. The three lanes 1901, 1902 and 1903 all run in the +y direction, and the rightmost lane 1903 is connected to a lane 1904 running in the −x direction.

The vehicle 1 is traveling in the same lane 1902 with the leader vehicle 1911 of the group 1910, positioned behind the leader vehicle 1911.

The controller 170 may compare the searched path of the vehicle 1 with the searched path of the leader vehicle 1911 to extract a route common to the two paths.

If the searched path of the vehicle 1 includes entry into the lane 1904 while the searched path of the leader vehicle 1911 does not include entry into the lane 1904, the common route 2 of the two paths corresponds to a path leading up to the lane 1904.

In this case, the controller 170 may determine the withdrawal position 1930 of the vehicle 1 between the current position of the vehicle 1 and the start position of the lane 1904.

As an example, the withdrawal position 1930 may be the position of the end of the common path. The controller 170 may also determine the target position 1920 of the vehicle 1 between the current position of the vehicle 1 and the withdrawal position 1930.

The controller 170 may transmit a withdrawal request including the withdrawal position 1930 to the leader vehicle 1911.

FIG. 19B is a view referred to in describing an operation of the vehicle associated with the situation shown in FIG. 19A.

FIG. 19B illustrates a guide screen 1950 provided to the driver of the vehicle 1 in the situation 1900 shown in FIG. 19A. For example, the guide screen 1950 may be displayed on one of the displays included in the display unit.

The guide screen 1950 provides a notification to guide the withdrawal position 1930 before the vehicle 1 reaches the withdrawal position 1930.

Specifically, the guide screen 1950 may include an indicator 1951 indicating the leader vehicle 1911, an indicator 1953 indicating the vehicle 1, an indicator 1960 indicating the target position 1920, an indicator 1970 indicating the withdrawal position 1930, and an indicator 1980 indicating a path from the withdrawal position 1930. As shown in the figure, the indicator 1951 indicating the leader vehicle 1911 may be displayed differently in color, shape, size, thickness, and the like from the indicator 1952 indicating the follower vehicle 1912.

Before or after the guide screen 1950 is provided, the controller 170 may control the vehicle 1 to execute at least one operation corresponding to the withdrawal position 1930. For example, the at least one operation corresponding to the withdrawal position 1930 may include performing lane change from the current lane 1902 of the vehicle 1 to the lane 1903 to which the target position 1920 belongs and maintaining the lane from the target position 1920 to the withdrawal position 1930. When the vehicle 1 reaches the withdrawal position 1930 after lane change, the vehicle 1 withdraws from the group 1910. That is, inter-vehicle communication with the leader vehicle 1911 is released. When the vehicle 1 reaches the withdrawal position 1930, the controller 170 may switch the vehicle 1 from the autonomous driving mode to the manual driving mode.

According to the embodiment illustrated in FIGS. 19A and 19B, the controller 170 may control the vehicle 1 to follow the leader vehicle 1911 in the lane 1903 different from the lane of the leader vehicle 1911 until the vehicle 1 withdraws from the group 1910. This makes it easier to enter the lane 1904 running in the −x direction than when the vehicle 1 follows the leader vehicle 1911 in the lane 1902 of the leader vehicle 1911.

The controller 170 may control the vehicle 1 such that the vehicle 1 moves to the withdrawal position 1930 via the target position 1920, thereby assisting the driver of the vehicle 1 in preparing an action necessary for manual driving (e.g., holding the steering wheel, gazing forward, checking the path).

FIG. 20 is a flowchart illustrating an exemplary control method S2000 according to an embodiment of the present invention.

The vehicle illustrated in FIG. 20 may be the vehicle 1 described with reference to FIG. 1. In addition, the control method S2000 according to FIG. 20 may be performed in parallel with at least one of the plurality of steps included in the control method S700 illustrated in FIG. 7 or the control method S1500 illustrated in FIG. 15.

Further, the control method S2000 according to FIG. 20 includes a plurality of steps, and each of the steps may be performed by at least one of the elements shown in FIG. 1. In addition, the vehicle described in FIG. 20 may have joined a group in the autonomous driving mode, or may be traveling in accordance with manipulation of the driver in the manual driving mode.

In step S2010, the controller 170 searches for a group around the vehicle. For example, the controller 170 may receive a message transmitted by a group present within a predetermined range from the current position of the vehicle through inter-vehicle communication, and search for the group around the vehicle based on the received message. The message transmitted by the group may include an ID of the group and the traveling information about the group. The traveling information about the group may include the position of the group, the speed of the group, the path of the group, the fuel efficiency of the group, the size of the group, and the driver state of the group.

Step S2010 may be executed only when a predefined operation occurs. For example, step S2010 may be executed when a command of a driver requesting search for a group around the vehicle is received. As another example, when the withdrawal position of the vehicle is determined in step S1510 shown in FIG. 15, step S2010 may be executed.

In step S2020, the controller 170 may determine whether there is a group discovered in step S2010. If no group is discovered, the controller 170 may return to step S2010.

In step S2030, the controller 170 may determine whether a plurality of groups has been discovered in step S2010. For example, the controller 170 may determine whether one group has been discovered or a plurality of groups has been discovered in step S2010, based on the IDs of the groups included in the messages received through inter-vehicle communication. If only one group has been discovered in step S2010, step S2040 is executed. If a plurality of groups has been discovered in step S2010, step S2050 is executed.

In step S2040, the controller 170 joins the discovered group. Specifically, the controller 170 transmits a join request to the discovered group through inter-vehicle communication. Thereafter, upon receiving an approval message for the join request from the discovered group, the controller 170 may join the group.

In step S2050, the controller 170 selects one of the plurality of groups. Specifically, the controller 170 may select one of the plurality of groups according to a command from the driver of the vehicle.

Alternatively, the controller 170 may select one of the plurality of groups using a predefined rule. The rule may be related to at least one of the position, velocity, path, fuel efficiency, size, and driver condition of the group. In addition, the rule may be set and changed by the driver of the vehicle. Specifically, one of the plurality of groups may be selected by applying the traveling information about each of the plurality of groups to the predefined rule. That is, one of the plurality of groups that best matches the predefined rule may be selected.

In step S2060, the controller 170 joins the group selected in step S2050. Specifically, the controller 170 transmits a join request to the selected group through inter-vehicle communication. Thereafter, upon receiving an approval message for the join request from the selected group, the controller 170 may join the group.

FIG. 21 is a view referred to in describing an operation of a vehicle according to an embodiment of the present invention. For simplicity, it is assumed that the vehicle 1 is currently in the autonomous driving mode.

FIG. 21 shows a top view 2100 of a road including four lanes 2101, 2102, 2103 and 2104. Within the road, three different groups 2110, 2120 and 2130 and the vehicle 1 are traveling in the +y direction. Specifically, four vehicles which have joined the group 2110 are traveling in the first lane 2101 and the second lane 2102, and three vehicles which have joined the lane 2120 are all traveling in the second lane 2102. Five vehicles which have joined the group 2130 are traveling in the third lane 2103 and the fourth lane 2104.

The communication unit of the vehicle 1 receives a group notification message including the ID of the group and the traveling information about the group from each of the groups 2110, 2120 and 2130 through inter-vehicle communication. The controller 170 may receive the group notification messages from the communication unit and recognize that three groups 2110, 2120, and 2130 exist around the vehicle 1.

FIGS. 22A to 22C are views referred to in describing an operation of the vehicle associated with the situation shown in FIG. 21.

FIG. 22A illustrates a situation 2210 in which one of the groups 2110, 2120 and 2130 is selected by applying a first rule to the traveling information about each of the groups 2110, 2120 and 2130. The first rule may be one that is defined to select a group closest to the vehicle 1. In FIG. 21, since the group 2120 is positioned closer to the vehicle 1 than the other two groups 2110 and 2120, the controller 170 may select the group 2120. The controller 170 may transmit a join request to the selected group 2120 and receive an approval by the leader vehicle of the group 2120, thereby causing the vehicle 1 to join the group 2120. In this case, as shown in the figure, the vehicle 1 may move to the rear end of the group 2120 by lane change, and start traveling in the group 2120.

FIG. 22B illustrates a situation 2220 in which one of the groups 2110, 2120 and 2130 is selected by applying a second rule to the traveling information about each of the groups 2110, 2120 and 2130. The second rule may be one that is defined to select a group exhibiting the most stable driver condition of the leader vehicle among the groups 2110, 2120, 2130. For example, the leader vehicle of each of the groups 2110, 2120, and 2130 may determine whether the driver is dozing at the wheel, based on a driver image provided by a camera provided in the indoor space. As another example, the leader vehicle of each of the groups 2110, 2120, and 2130 may receive biometric information about the driver from the wearable device worn by the driver, and may determine whether the driver is stable or unstable based on the biometric information. The information on the driver condition determined by each of the leader vehicles may be transmitted to the vehicle 1 via the group notification message described above.

Suppose that the drivers of the leader vehicles of the two groups 2120 and 2130 among the three groups 2110, 2120 and 2130 are dozing at the wheel while driving. The controller 170 may select the group 2110 according to the second rule. The controller 170 may transmit a join request to the selected group 2110, receive an approval from the leader vehicle of the group 2110, and then cause the vehicle 1 to join the group 2110. In this case, as shown in the figure, the vehicle 1 may make a lane change from the second lane 2102 to the first lane 2101 after making a lane change from the current lane 2103 to the second lane 2102. Thus, the vehicle 1 may move to the rear end of the group 2110 and start traveling in the group 2110.

FIG. 22C illustrates a situation 2230 in which one of the groups 2110, 2120, and 2130 is selected by applying a third rule to the traveling information about each of the groups 2110, 2120, and 2130. The third rule may be defined to select a group having the highest fuel efficiency (e.g., instantaneous fuel efficiency, average fuel efficiency) among the plurality of groups.

Assuming that the fuel efficiency of the group 2110 is 17 km/l, the fuel efficiency of the group 2120 is 13 km/l and the fuel efficiency of the group 2130 is 18 km/l, the controller 170 may select the group 2130 according to the third rule. The controller 170 may transmit a join request to the selected group 2130, receive an approval from the leader vehicle of the group 2130, and then cause the vehicle 1 to join the group 2130. In this case, as shown in the figure, the vehicle 1 may move to the rear end of the group 2130 through acceleration without changing lanes, and start traveling in the group 2130.

While FIGS. 22A an 22B illustrate a group selection operation according to the first to third rules, embodiments of the present invention are not limited thereto. That is, various rules related to the speed, size, etc. of the groups may be applied to group selection.

FIG. 23 is a view referred to in describing an operation of the vehicle related to the situation shown in FIG. 21.

According to FIG. 23, in the situation 2300 shown in FIG. 21, a guide screen 2310 may be provided to the driver of the vehicle 1. As an example, the guide screen 2310 may be displayed on one of the displays included in the display unit.

The guide screen 2310 provides a notification to guide a withdrawal position 2330 before the vehicle 1 reaches the withdrawal position 2330.

Specifically, the guide screen 2310 may include an indicator 2311 indicating the vehicle 1, an indicator 2321 indicating the first group 2110, an indicator 2322 indicating the second group 2120, and an indicator 2323 indicating the third group 2130. In this case, the indicator 2321, the indicator 2322, and the indicator 2323 may have different colors, shapes, or sizes. For example, as shown in the figure, the indicator 2321 may be displayed in a rectangular shape, the indicator 2322 may be displayed in a circular shape, and the indicator 2323 may be displayed in a triangular shape. Thus, the driver of the vehicle 1 may easily distinguish the groups.

The guide screen 2310 may further include at least one of a menu 2351 for guiding the traveling information about the first group 2110, a menu 2352 for guiding the traveling information about the second group 2120, and a menu 2353 for guiding the traveling information about the third group 2130.

When the display for outputting the guide screen 2310 has a touchscreen, the driver may select any one of the menus 2351, 2352, and 2353 by applying touch input to the touchscreen.

For example, when the driver of the vehicle 1 touches the menu 2351, the controller 170 may select the first group 2110. In this case, as shown in FIG. 22B, the controller 170 may control the vehicle 1 such that the vehicle 1 moves into the first lane 2101.

As another example, when the driver of the vehicle 1 touches the menu 2352, the controller 170 may select the second group 2120. In this case, as shown in FIG. 22A, the control section 170 may control the vehicle 1 such that the vehicle 1 moves into the second lane 2102.

As another example, when the driver of the vehicle 1 touches the menu 2353, the controller 170 may select the third group 2130. In this case, as shown in FIG. 22C, the controller 170 may control the vehicle 1 such that the vehicle 1 accelerates to a position at the rear end of the third group 2130.

The embodiments of the present invention described above may be implemented not only through an apparatus and method but also through a program for implementing functions corresponding to configurations of the embodiments and a recording medium on which the program is recorded. In addition, those skilled in the art can easily implement the present invention based on the description of the embodiments given above.

In addition, those skilled in the art will appreciate that various modifications, additions and substitutions are possible, without departing from the scope and spirit of the invention as disclosed in the accompanying claims. Accordingly, various modifications may be made to the present invention by selectively combining all or some of the respective embodiments without being limited to the embodiments described above and the accompanying drawings.

The invention claimed is:

1. A vehicle comprising:
at least one sensor configured to acquire traveling information about the vehicle and environment information in a vicinity of the vehicle; and
a controller configured to receive traveling information about a first group, determine a target position of the vehicle with respect to the first group based on at least one of the traveling information about the vehicle, the external environment information, and the traveling information about the first group, and control the vehicle to execute at least one operation corresponding to the target position,
wherein vehicles having joined the first group are traveling on a road that has a plurality of lanes,
wherein the controller determines a distance between a leader vehicle of the first group and the vehicle based on the traveling information about the first group and the traveling information about the vehicle, and
wherein, based on the distance between the leader vehicle and the vehicle being greater than or equal to a threshold value, the controller determines the target position within an area of a lane different from a current lane of the vehicle.

2. The vehicle according to claim 1, wherein the target position is within an area of a lane different from a lane of a leader vehicle of the first group.

3. The vehicle according to claim 1, wherein the target position is within a predetermined distance from a leader vehicle of the first group.

4. A vehicle comprising:
at least one sensor configured to acquire traveling information about the vehicle and environment information in a vicinity of the vehicle; and
a controller configured to receive traveling information about a first group, determine a target position of the vehicle with respect to the first group based on at least one of the traveling information about the vehicle, the external environment information, and the traveling information about the first group, and control the vehicle to execute at least one operation corresponding to the target position,
wherein vehicles having joined the first group are traveling on a road that has a plurality of lanes,
wherein the controller determines, based on the external environment information, whether another vehicle having not joined the first group enters into a front of the vehicle, and
wherein, when it is determined that the other vehicle enters into the front of the vehicle, the controller determines the target position within an area of a lane different from a current lane of the vehicle.

5. The vehicle according to claim 1, wherein the controller detects an empty lane among the plurality of lanes based on the external environment information, and determines the target position within the area of the empty lane.

6. The vehicle according to claim 1, wherein the controller determines, based on the traveling information about the first group, whether at least one follower vehicle has joined the first group, and
wherein, when it is determined that the at least one follower vehicle has joined the first group, the controller determines the target position within an area of a lane of one of the at least one follower vehicle.

7. A vehicle comprising:
at least one sensor configured to acquire traveling information about the vehicle and environment information in a vicinity of the vehicle; and a controller configured to receive traveling information about a first group, determine a target position of the vehicle with respect to the first group based on at least one of the traveling information about the vehicle, the external environment information, and the traveling information about the first group, and control the vehicle to execute at least one operation corresponding to the target position, wherein vehicles having joined the first group are traveling on a road that has a plurality of lanes, wherein, based on a plurality of follower vehicles having joined the first group and traveling in two or more lanes included in the road, the controller determines the target position within an area of one of the plurality of follower vehicles.

8. The vehicle according to claim 1, wherein, when a current lane of the vehicle is different from a lane to which the target position belongs, the controller controls the vehicle to move from the current lane of the vehicle into the lane to which the target position belongs.

9. A vehicle comprising:
at least one sensor configured to acquire traveling information about the vehicle and environment information in a vicinity of the vehicle; and
a controller configured to receive traveling information about a first group, determine a target position of the vehicle with respect to the first group based on at least one of the traveling information about the vehicle, the external environment information, and the traveling information about the first group, and control the vehicle to execute at least one operation corresponding to the target position,
wherein vehicles having joined the first group are traveling on a road that has a plurality of lanes,
wherein the controller determines a withdrawal position of the vehicle to withdraw from the first group, based on at least one of the traveling information about the vehicle, the external environment information, and the traveling information about the first group.

10. The vehicle according to claim 9, wherein the controller extracts a route common to a path of the leader vehicle and a path of the vehicle, and determines the withdrawal position within the common path.

11. The vehicle according to claim 9, wherein the controller provides a notification to guide the withdrawal position before the vehicle reaches the withdrawal position.

12. The vehicle according to claim 11, wherein the notification comprises a message indicating at least one action for a driver of the vehicle to take before reaching the withdrawal position.

13. The vehicle according to claim 9, wherein the controller transmits a withdrawal request including the withdrawal position to a leader vehicle of the first group before the vehicle reaches the withdrawal position.

14. The vehicle according to claim 9, wherein the controller switches the vehicle from an autonomous driving mode to a manual driving mode upon reaching the withdrawal position.

15. The vehicle according to claim 9, wherein the controller searches for another group within the road after r determining the withdrawal position to withdraw from the first group.

16. The vehicle according to claim 15, wherein the controller provides a notification indicating whether or not the other group has been discovered.

17. The vehicle according to claim 15, wherein, when a plurality of groups is discovered, the controller displays indicators indicating the groups, respectively.

18. The vehicle according to claim 15, wherein, when a plurality of groups is discovered, the controller selects one of the plurality of groups based on an input of a driver of the vehicle, and transmits a join request to the selected group.

19. The vehicle according to claim 13, wherein, when a plurality of groups is discovered, the controller selects one of the groups by applying a predefined rule to traveling information about each of the groups, and transmits a join request to the selected group.

20. The vehicle according to claim 19, wherein the traveling information about the plurality of groups comprises at least one of a position, a speed, a path, a fuel efficiency, a size, or a driver state of each of the plurality of groups.

21. A vehicle control method, comprising:
acquiring, by at least one sensor, traveling information about a vehicle and environment information in a vicinity of the vehicle;
receiving, by a communicator, traveling information about a first group, the first group including vehicles traveling on road that has a plurality of lanes;
determining, by a processor, a target position of the vehicle with respect to the first group based on at least one of the traveling information about the vehicle, the environment information, and the traveling information about the first group; and
controlling, by the processor, the vehicle to execute at least one operation to arrive at the target position,
wherein the determining of the target position comprises:
determining, by the processor, a distance between a leader vehicle of the first group and the vehicle based on the traveling information about the first group and the traveling information about the vehicle, and
determining, by the processor and based on the distance between the leader vehicle and the vehicle being greater than or equal to a threshold value, the target position within an area of a lane different from a current lane of the vehicle.

* * * * *